(12) United States Patent
Latrasse et al.

(10) Patent No.: US 11,768,392 B2
(45) Date of Patent: Sep. 26, 2023

(54) OPTICAL MODULATOR ROBUST TO FABRICATION ERRORS THROUGH AN RF ELECTRICAL CROSSING

(71) Applicant: Ciena Corporation, Hanover, MD (US)

(72) Inventors: Christine Latrasse, Québec (CA); Alexandre Delisle-Simard, Québec (CA); Michel Poulin, Québec (CA); Ian Betty, Ottawa (CA); Arash Khajooeizadeh, Ottawa (CA); Michael Vitic, Chelsea (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/959,229

(22) Filed: Oct. 3, 2022

(65) Prior Publication Data

US 2023/0102304 A1    Mar. 30, 2023

Related U.S. Application Data

(63) Continuation of application No. 16/944,809, filed on Jul. 31, 2020, now Pat. No. 11,460,724, which is a
(Continued)

(51) Int. Cl.
*G02F 1/025*     (2006.01)
*G02F 1/225*     (2006.01)
(Continued)

(52) U.S. Cl.
CPC ............ *G02F 1/025* (2013.01); *G02F 1/2257* (2013.01); *G02B 6/12002* (2013.01);
(Continued)

(58) Field of Classification Search
None
See application file for complete search history.

(56) References Cited

U.S. PATENT DOCUMENTS 9,841,618 B1    12/2017   Poulin et al.
10,241,354 B1    3/2019   Gill
(Continued)

FOREIGN PATENT DOCUMENTS

GB    2348293 A    9/2000
JP    201721607 A    11/2017

OTHER PUBLICATIONS

Ning-Ning Feng et al., High speed carrier-depletion modulators with 1.4V-cm VπL integrated on 0 25 μm silicon-on-insulator waveguides, 2010 Optical Society of America, Apr. 12, 2010/Vo. 18, No. 8/Optics Express 7994, pp. 1-6.
(Continued)

*Primary Examiner* — Jerry Rahll
(74) *Attorney, Agent, or Firm* — Baratta Law PLLC; Lawrence A. Baratta, Jr.

(57) ABSTRACT

An optical modulator includes a first Radio Frequency (RF) line and a second RF line; an optical waveguide along a length of the modulator with an input and an output; and a plurality of segments along the length including a first set of segments, a single RF line crossing, and a second set of segments, wherein the first set of segments and the second set of segments have an inversion of their respective orientation at the RF line crossing, and wherein the RF line crossing is located off center relative to the plurality of segments, wherein each of the first RF line and the second RF line extend along the length and cross one another at the RF line crossing.

20 Claims, 16 Drawing Sheets

Related U.S. Application Data continuation-in-part of application No. 16/609,069, filed as application No. PCT/US2018/027239 on Apr. 12, 2018, now Pat. No. 10,823,988, which is a continuation of application No. 15/582,050, filed on Apr. 28, 2017, now Pat. No. 10,330,961.

(51) Int. Cl.
  *G02B 6/12* (2006.01)
  *G02B 6/134* (2006.01)
  *G02F 1/015* (2006.01)
  *G02F 1/21* (2006.01)

(52) U.S. Cl.
  CPC .... *G02B 6/134* (2013.01); *G02B 2006/12061* (2013.01); *G02B 2006/12142* (2013.01); *G02F 1/0152* (2021.01); *G02F 1/212* (2021.01)

(56) References Cited

U.S. PATENT DOCUMENTS

| | | |
|---|---|---|
| 2004/0240765 A1 | 12/2004 | Wooten et al. |
| 2005/0123242 A1 | 6/2005 | Walker et al. |
| 2007/0076999 A1 | 4/2007 | Miyazaki et al. |
| 2010/0202784 A1 | 8/2010 | Sugiyama |
| 2013/0209023 A1 | 8/2013 | Prosyk |
| 2013/0343693 A1 | 12/2013 | Doerr |
| 2014/0112611 A1* | 4/2014 | Vermeulen ............ G02F 1/225 385/3 |
| 2014/0153860 A1 | 6/2014 | Prosyk |
| 2014/0341499 A1 | 11/2014 | Manouvrier |
| 2014/0355925 A1 | 12/2014 | Manouvrier |
| 2014/0376852 A1 | 12/2014 | Manouvrier |
| 2018/0307062 A1 | 10/2018 | Poulin et al. |
| 2019/0155064 A1 | 5/2019 | Tytgat et al. |
| 2019/0324345 A1 | 10/2019 | Vera Villarroel |
| 2020/0292908 A1 | 9/2020 | Tsuzuki et al. |
| 2021/0080796 A1 | 3/2021 | Kissa et al. |
| 2021/0080797 A1 | 3/2021 | Kissa et al. |
| 2021/0080798 A1 | 3/2021 | Kissa et al. |
| 2021/0311336 A1 | 10/2021 | Kharel et al. |

OTHER PUBLICATIONS

Vermeulen et al., Demonstration of Silicon Photonics Push-Pull Modulators Designed for Manufacturability, IEEE Photonics Technology Letters, vol. 28, No. 10, May 15, 2016, pp. 1127-1129.

Aug. 3, 2018, International Search Report and Written Opinion for International Application No. PCT/US2018/027239.

Nov. 29, 2021, International Search Report and Written Opinion for International Patent Application No. PCT/US2021/043497.

* cited by examiner

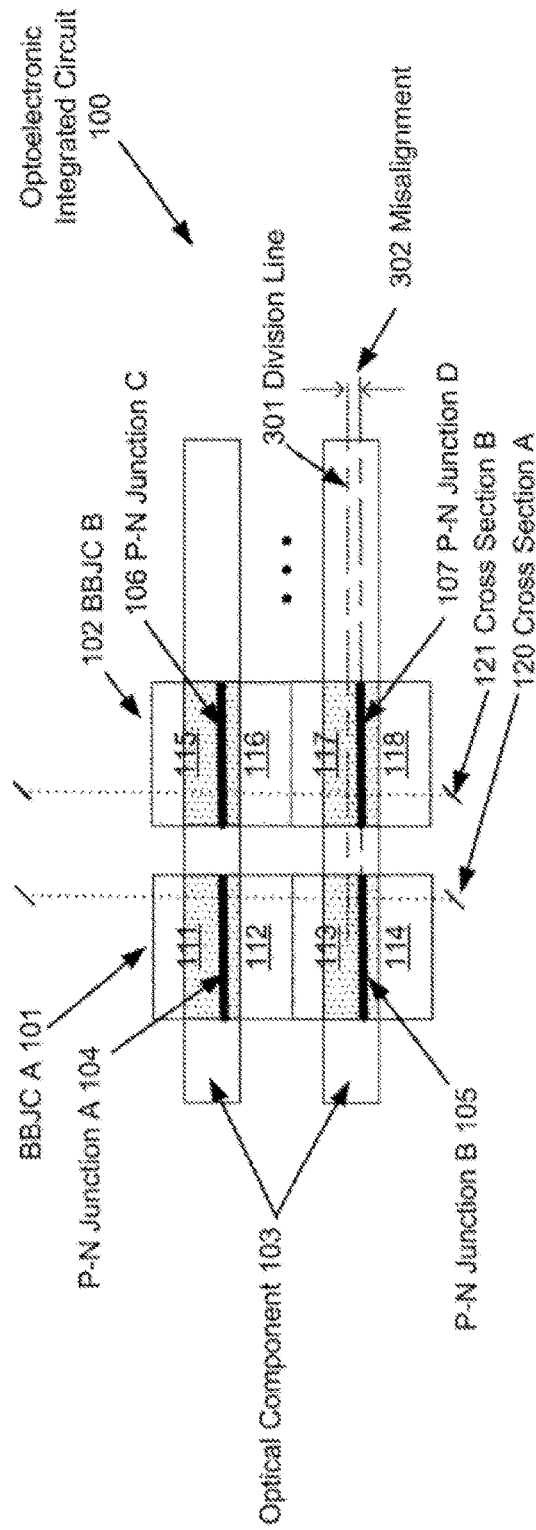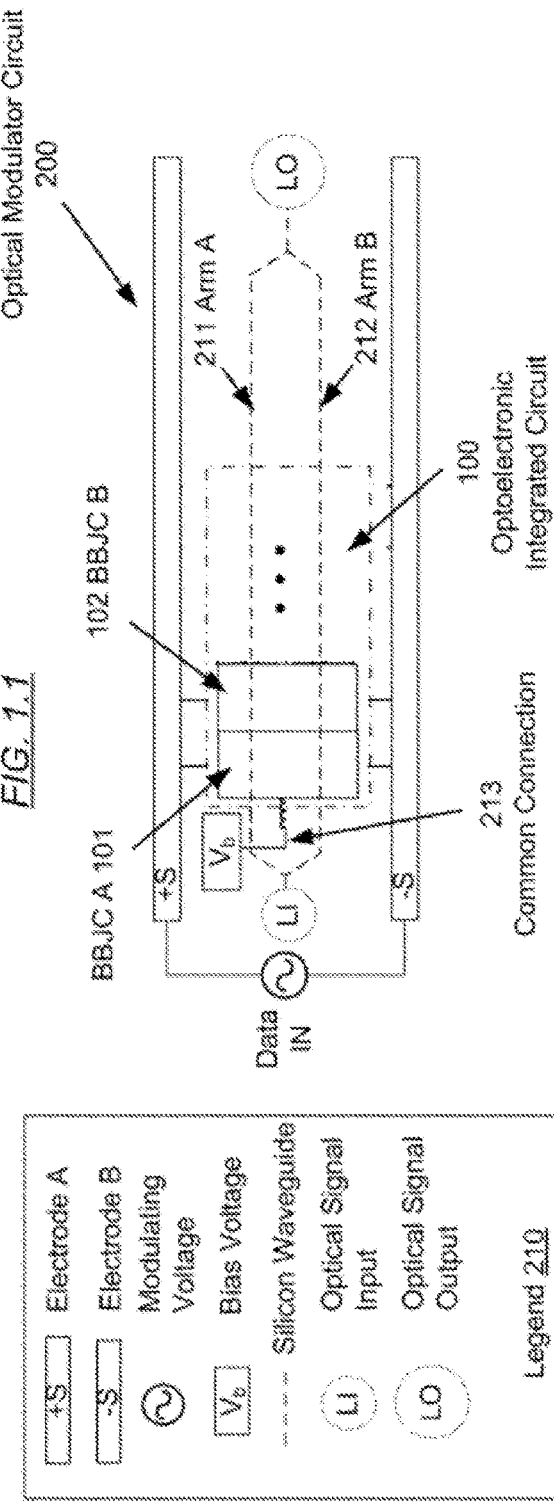
FIG. 1.1
FIG. 1.2

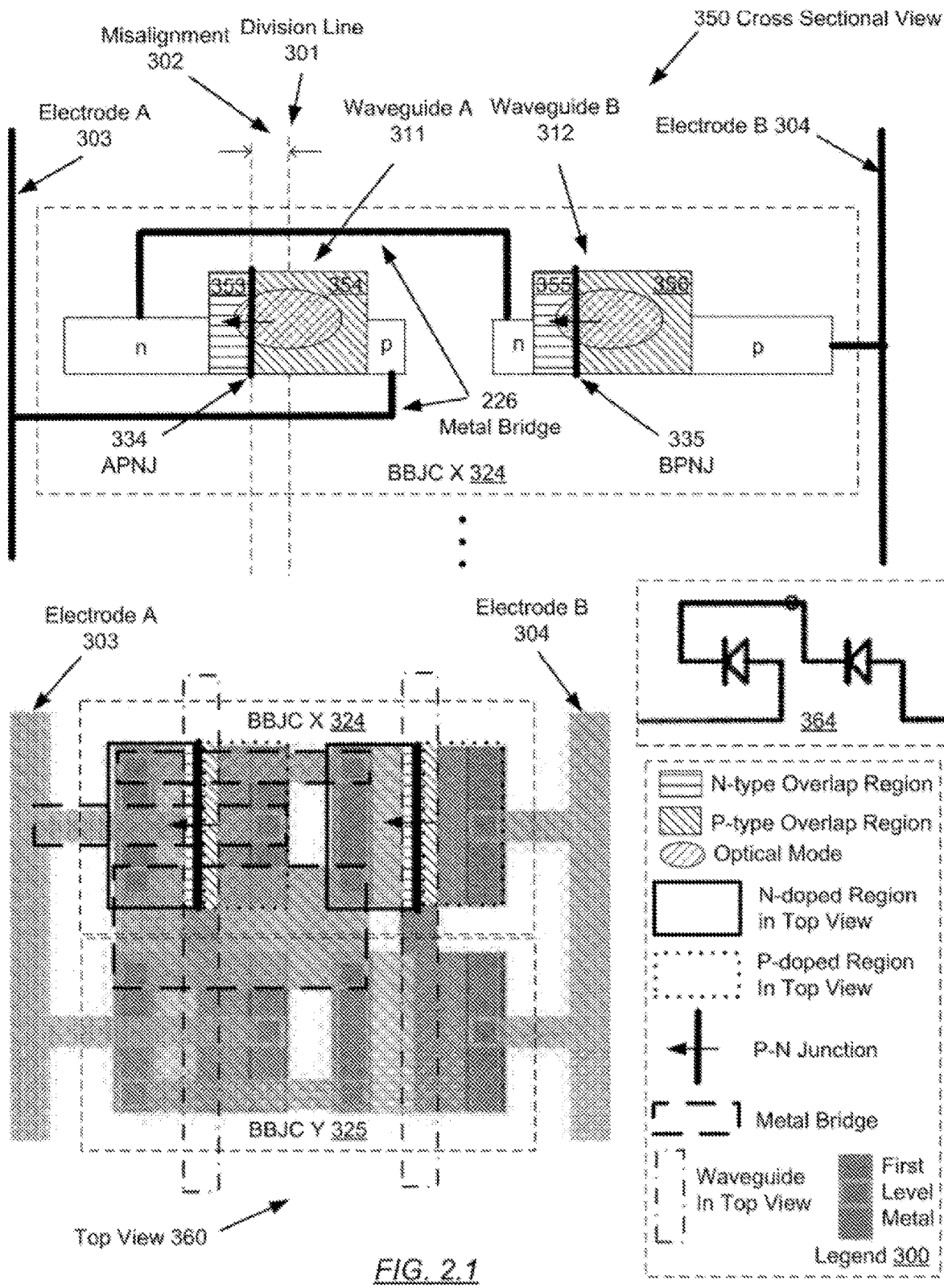
FIG. 2.1

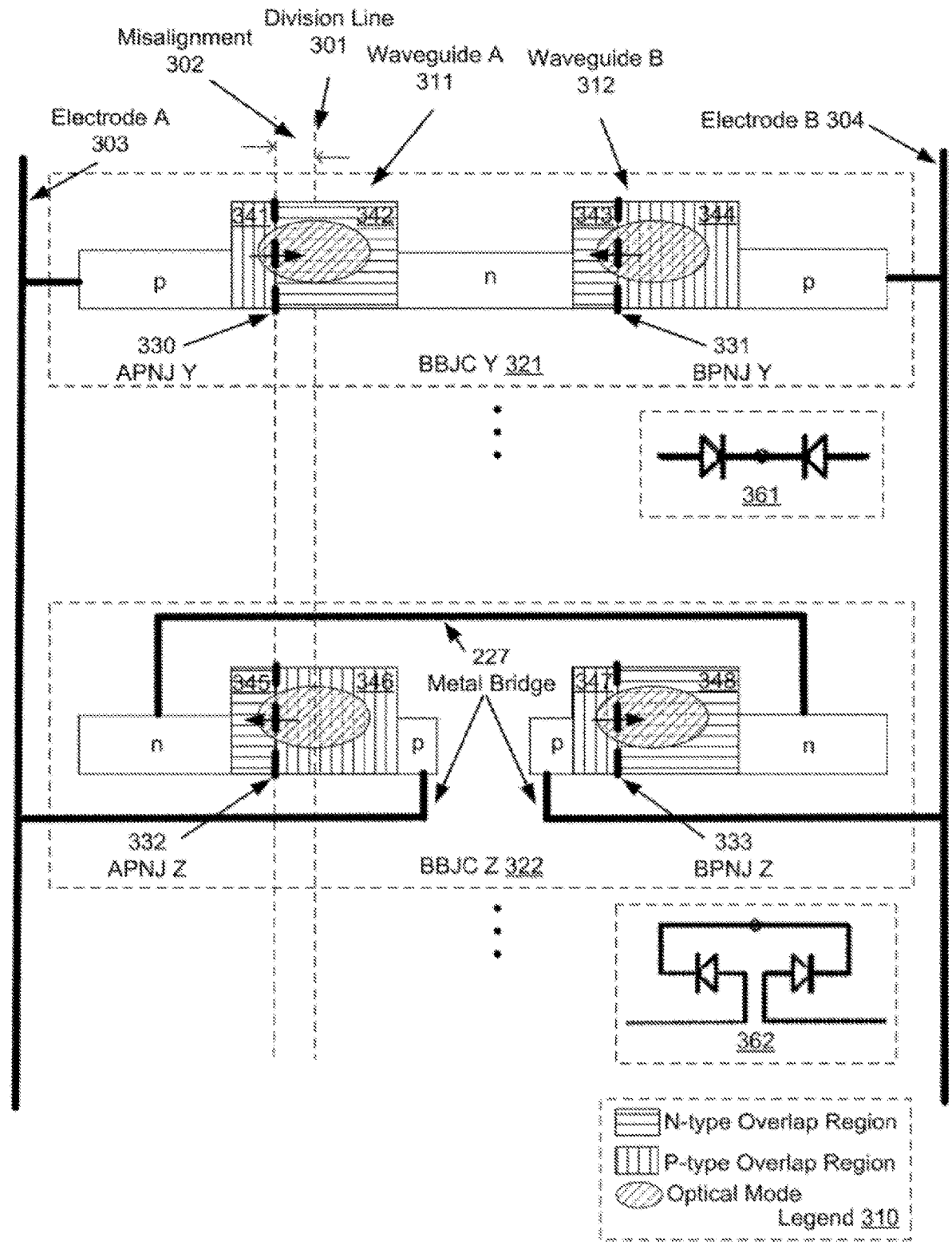
FIG. 2.2

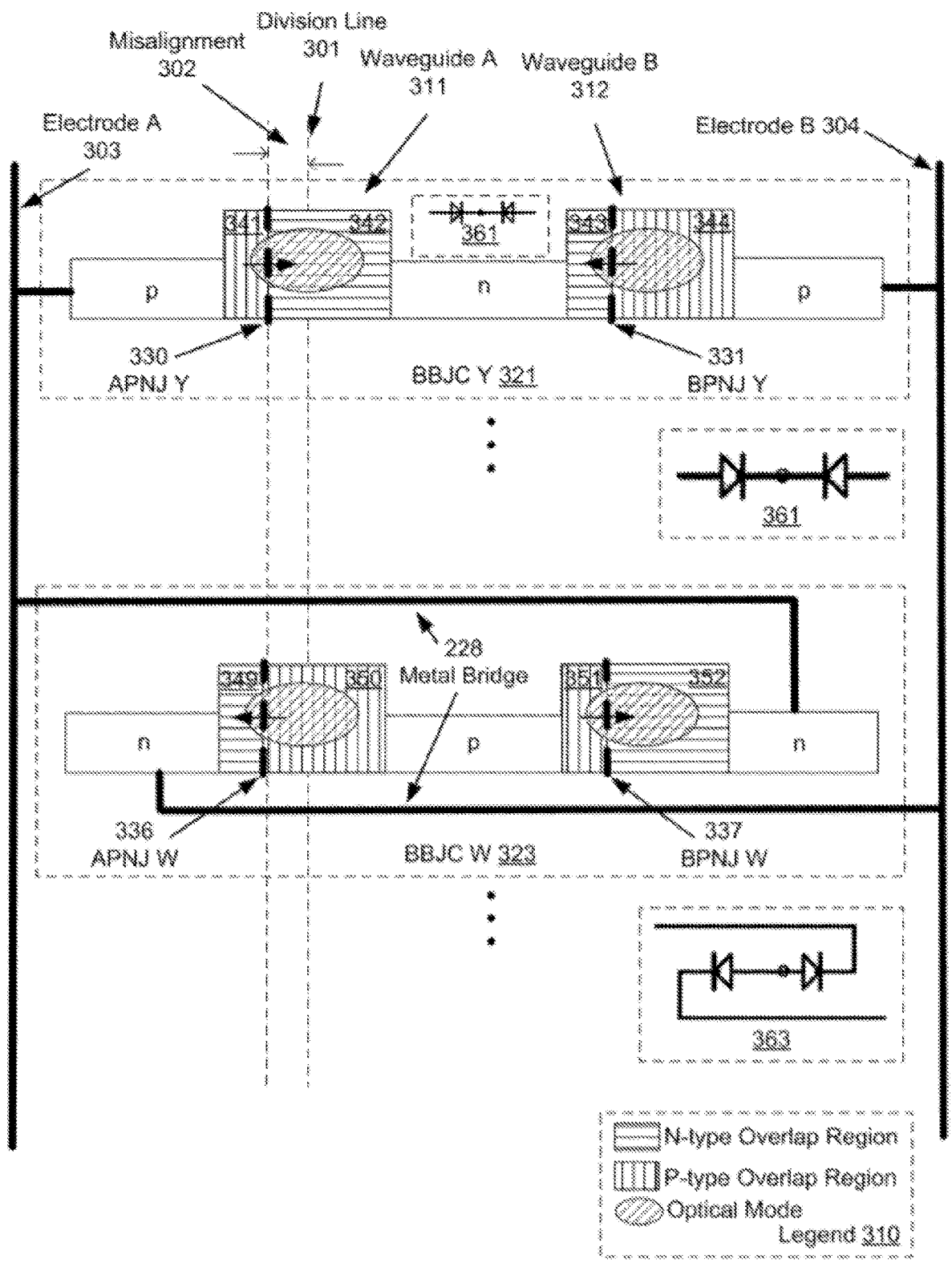
FIG. 2.3

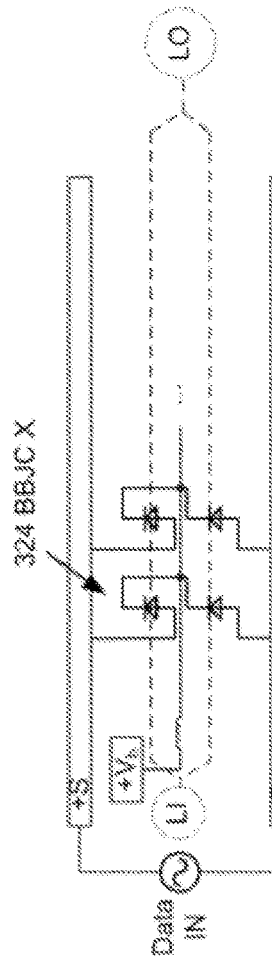
FIG. 4
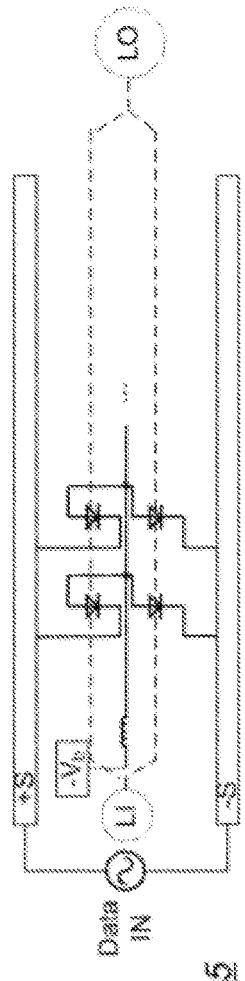
FIG. 5
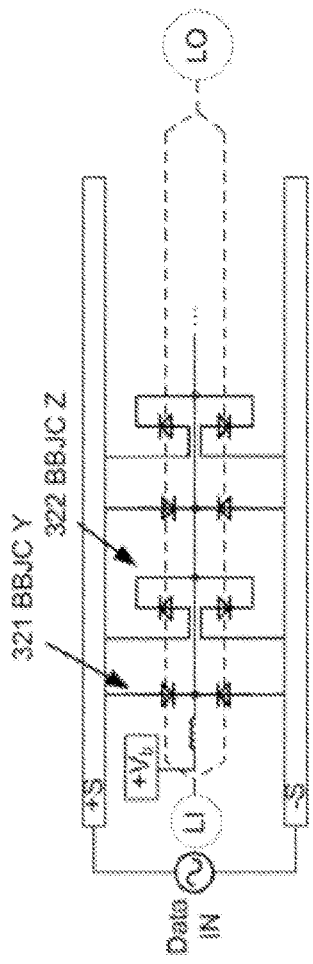
FIG. 6
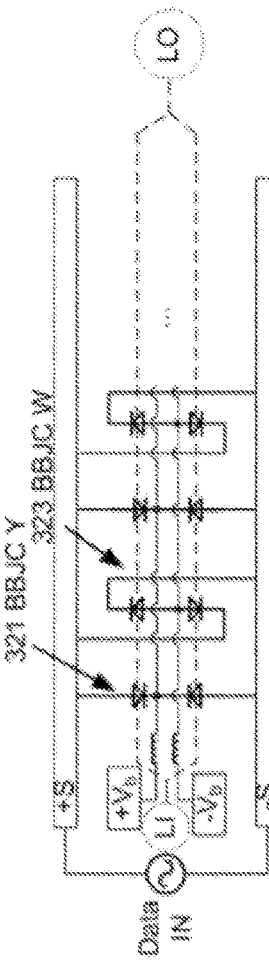
FIG. 7
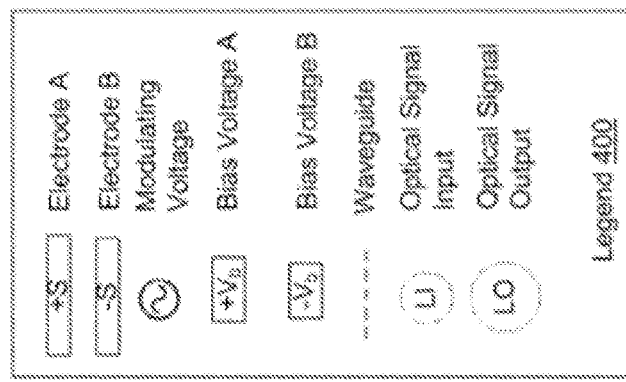

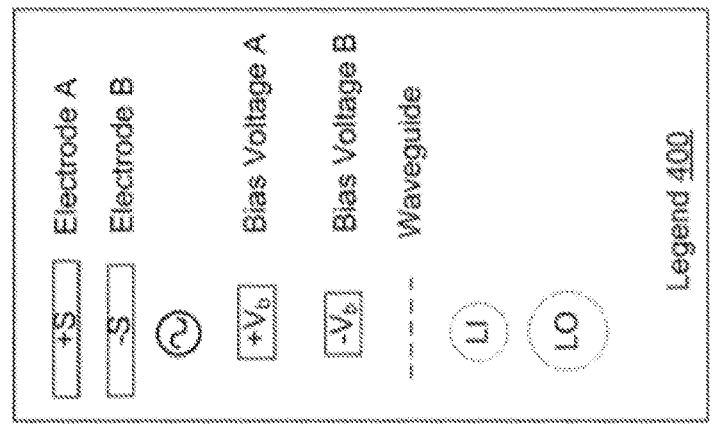
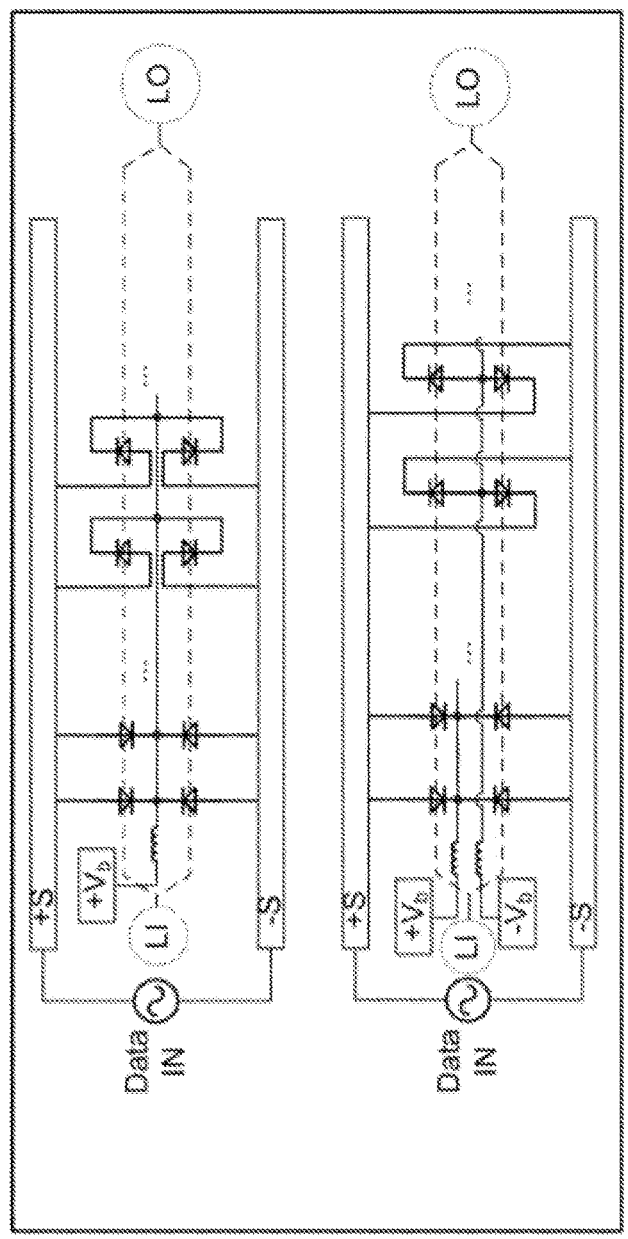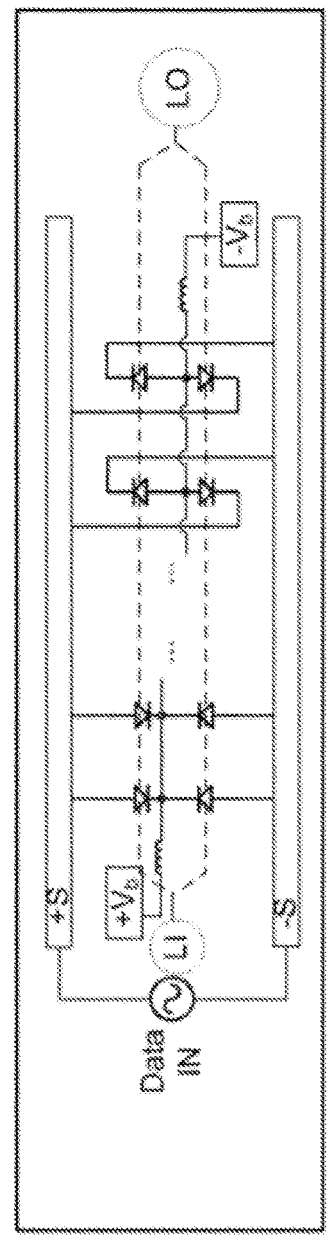
*FIG. 8*
*FIG. 9*

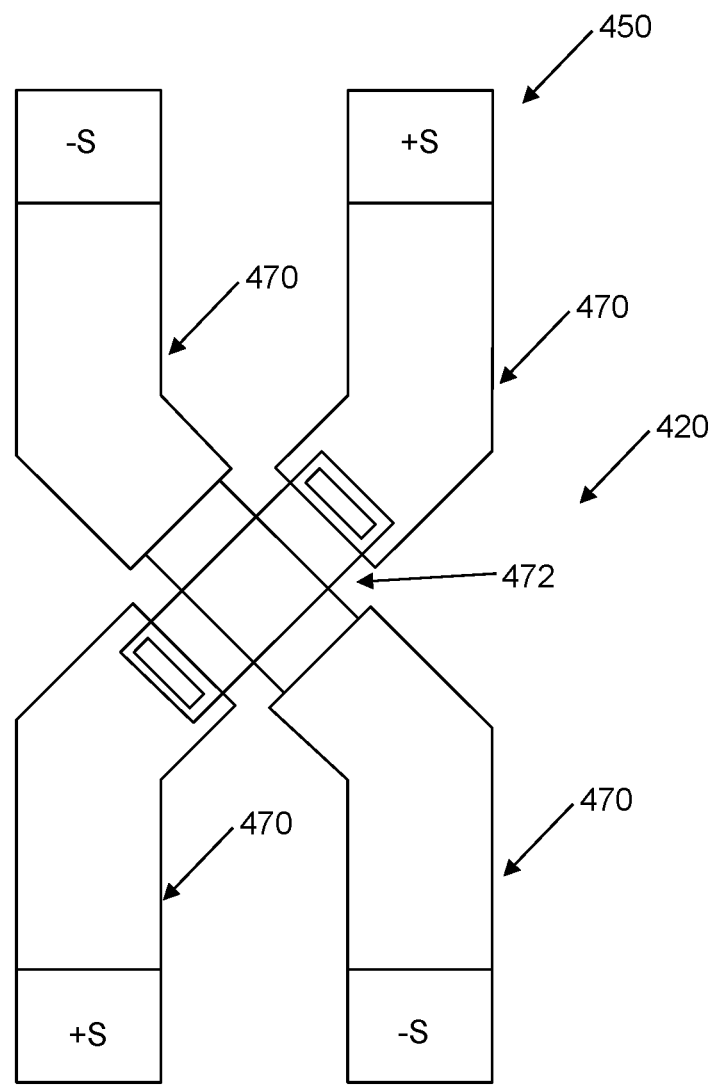
FIG. 15.1
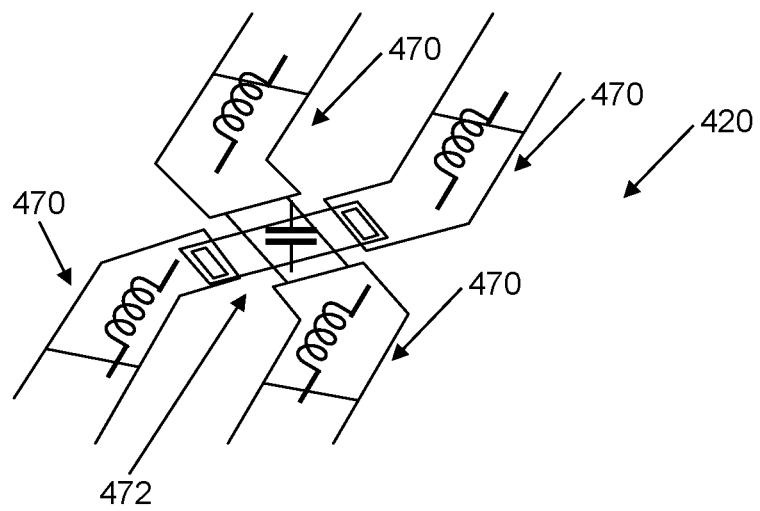
FIG. 15.2

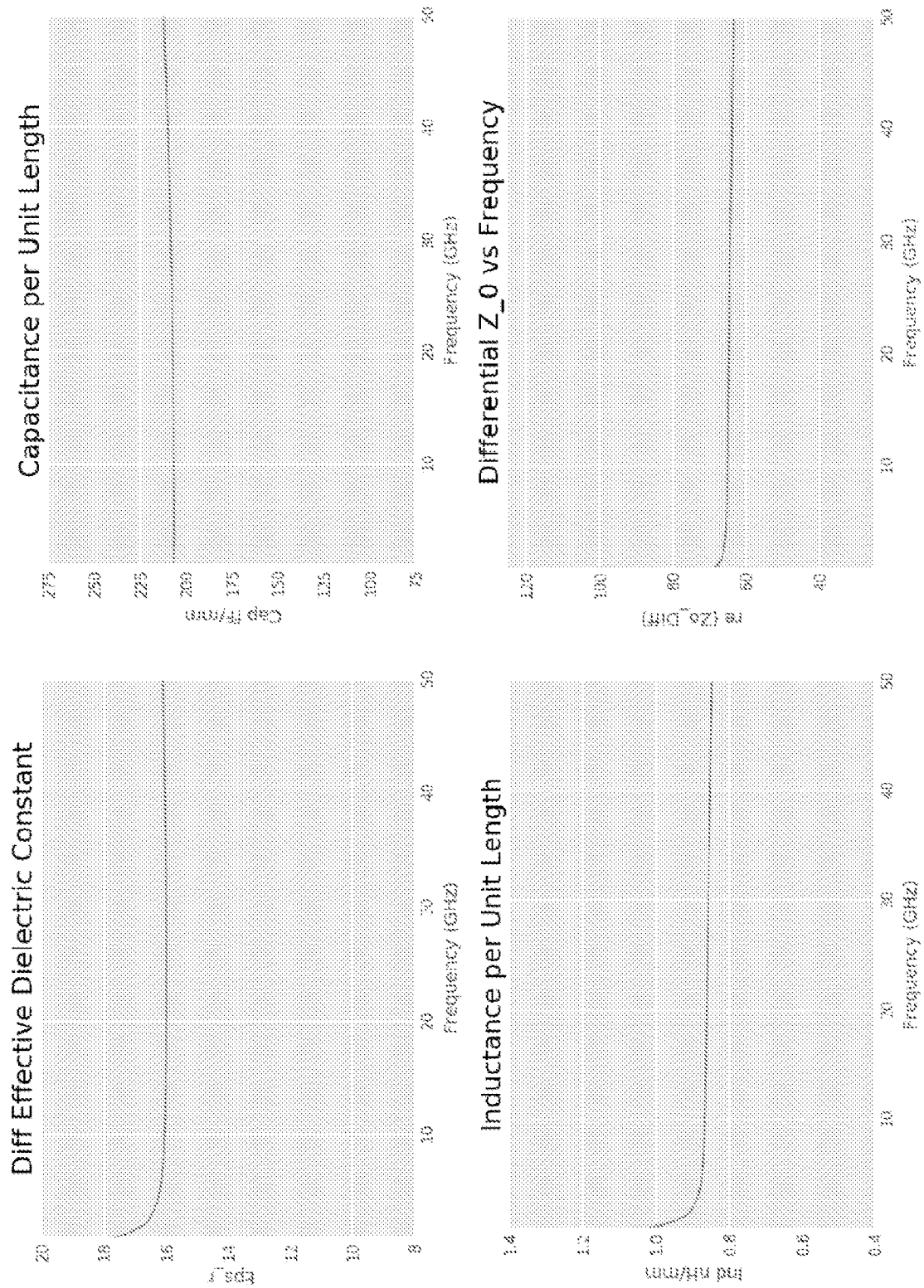
FIG. 17.1

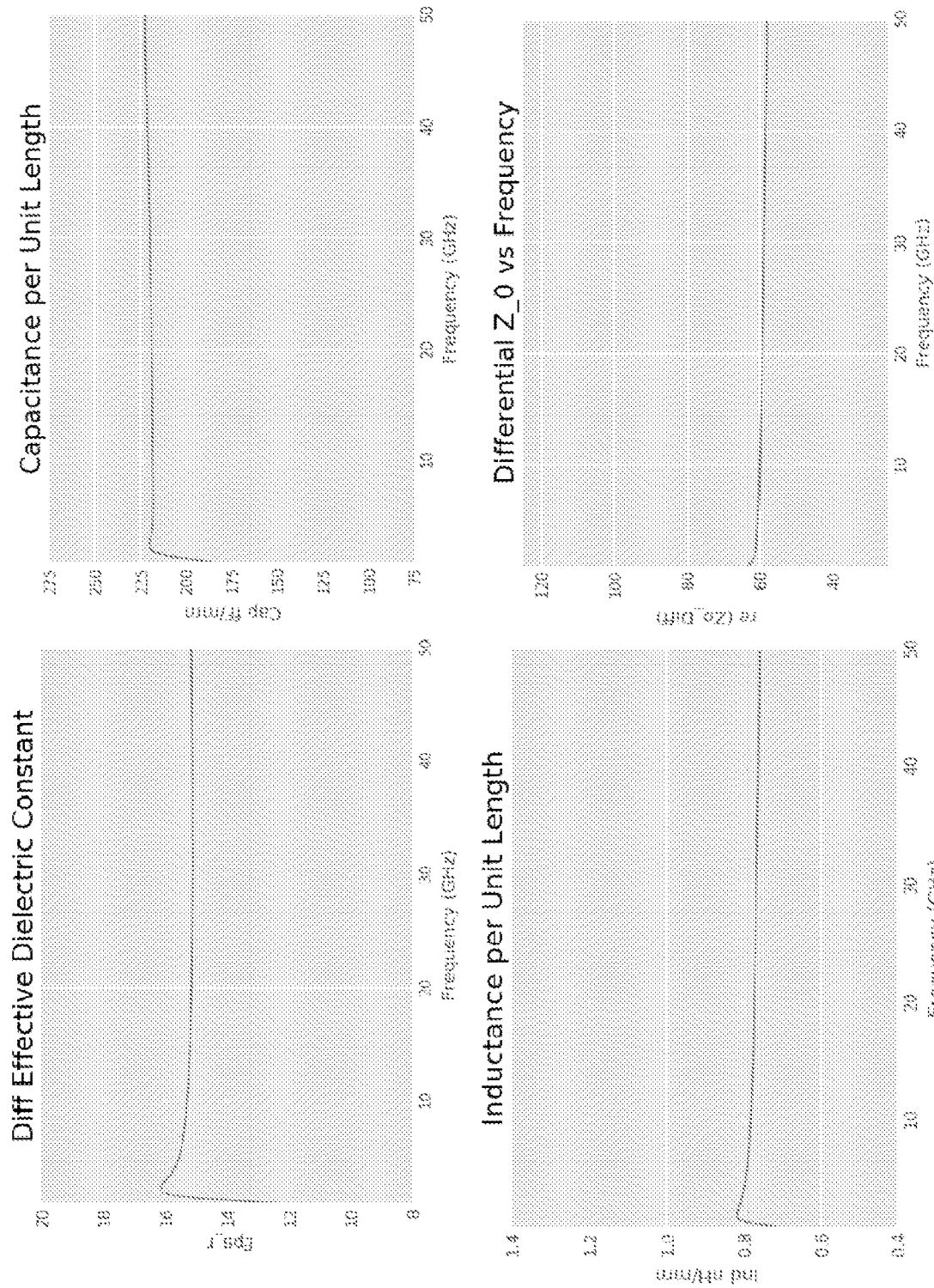
FIG. 17.2

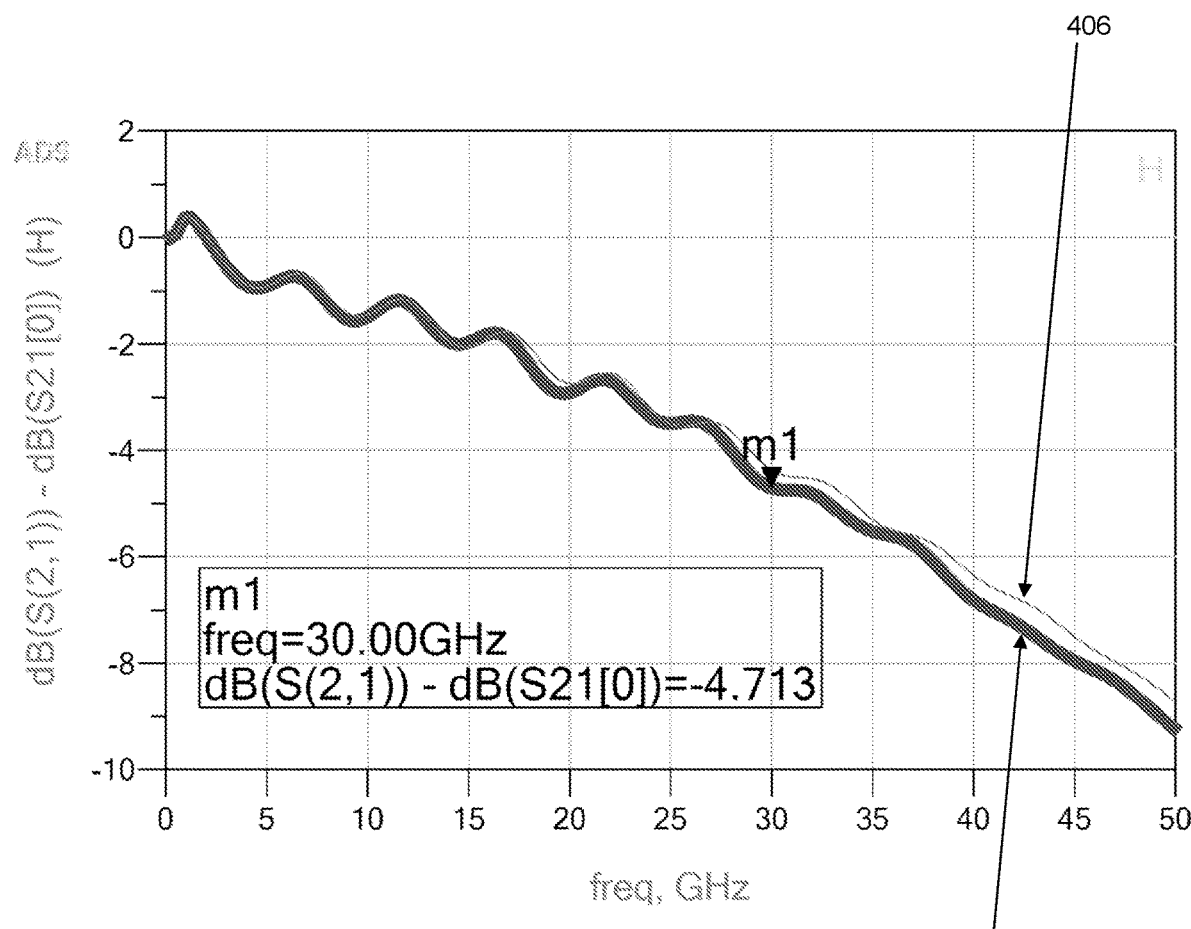
FIG. 17.3

OPTICAL MODULATOR ROBUST TO FABRICATION ERRORS THROUGH AN RF ELECTRICAL CROSSING

CROSS-REFERENCE TO RELATED APPLICATION(S)

The present disclosure is a continuation of U.S. patent application Ser. No. 16/944,809, filed Jul. 31, 2020, and now U.S. Pat. No. 11,460,724 with an issue date of Oct. 4, 2022, which is a continuation in part of U.S. patent application Ser. No. 16/609,069, filed Oct. 28, 2019, and now U.S. Pat. No. 10,823,988 with an issue date of Nov. 3, 2022, which was a national stage application of PCT Patent Application No. PCT/US18/27239, filed on Apr. 12, 2018, which claims priority to U.S. patent application Ser. No. 15/582,050, filed Apr. 28, 2017, and now U.S. Pat. No. 10,330,961, issued Jun. 25, 2019, the contents of each are incorporated by reference in their entirety.

BACKGROUND

An electronic component is a component that conducts, transmits, receives, generates, or otherwise uses an electrical current and/or signal during the operation of the component. An optoelectronic component is an electronic component that also uses an optical signal during operation. An optoelectronic integrated circuit is a set of optoelectronic components on one small flat piece referred to as a "chip", which is created from a batch fabrication process using a wafer. The wafer may include semiconductor material (e.g., silicon) overlaid with additional material layers (e.g., metal, oxide, etc.) to simultaneously fabricate a large number of the optoelectronic integrated circuits. Subsequent to the wafer fabrication, multiple optoelectronic integrated circuits are separated into chips for final packaging. The layout of the optoelectronic integrated circuit is the designed placement of planar geometric component shapes of the optoelectronic integrated circuit. A fabrication pattern of the optoelectronic integrated circuit is the pattern of semiconductor, oxide, metal, or other material layers formed on a wafer, die, and/or chip based on the layout. Misalignment is the shifting among layers in the fabrication pattern with respect to the layout.

A p-n junction is a boundary or interface between a p-type region and an n-type region of semiconductor material. The p-type region and the n-type region are created by selectively doping (e.g., via an ion implantation process, diffusion process, epitaxy process, etc.) the semiconductor material using a p-type dopant or an n-type dopant, respectively. The fabrication pattern of the p-type region and the n-type region is based on one or more lithography masks used to perform the selective doping.

A waveguide is an optoelectronic component having a physical structure that confines and guides the propagation of an electromagnetic (EM) wave, e.g., as an optical signal. A mode is an electromagnetic (EM) field pattern in the waveguide. The fabrication pattern of the waveguide corresponds to the physical structure and is based on one or more lithography masks used to form the physical structure.

SUMMARY

In general, in one aspect, an optical modulator includes multiple segments including modulator segments and a Radio Frequency (RF) crossing segment where RF lines extending a length of the modulator cross one another. The present disclosure includes optimization of one or more of a geometry of the RF crossing and a location of the RF crossing segment along the length. The geometry is selected so that the RF crossing segment appears as another segment having similar characteristics as modulator segments. The location of the RF crossing segment is selected to balance out fabrication error and phase efficiency.

In general, in one aspect, an optical modulator includes a first Radio Frequency (RF) line and a second RF line; an optical waveguide along a length of the modulator with an input and an output; and a plurality of segments along the length including a first set of pn junctions, an RF line crossing, and a second set of pn junctions, wherein the first set of pn junctions and the second set of pn junctions have an inversion of their respective orientation at the RF line crossing, and wherein the RF line crossing is located at a crossing segment that is not a center segment of the plurality of segments, wherein each of the first RF line and the second RF line extend along the length and cross one another at the RF line crossing. A location of the crossing segment can be based on an average loss or sum of voltages over a band of interest. A location of the crossing segment can be selected based on RF imbalance caused by the RF line crossing. The crossing segment can be located closer to the input than the output along the length.

A geometry of the RF line crossing can include any of a length of unloaded lines, a width of the unloaded lines, metal features around the RF line crossing, and an angle of crossing lines connected to respective unloaded lines, and wherein part or all of the geometry is selected such that one or more characteristics of the crossing segment are similar to corresponding one or more characteristics of modulator segments of the plurality of segments. The one or more characteristics can include any capacitance, inductance, impedance, propagation speed, and dielectric constant. Each segment in the first set of pn junctions can have a same orientation, and each segment in the second set of pn junctions can have a same orientation different from the orientation of the first set of pn junctions. One or more segments in the first set of pn junctions can have a different orientation from one another, and one or more segments in the second set of pn junctions can have a different orientation from one another. The respective orientation in each of the first set of pn junctions and the second set of pn junctions can be one of a nppn configuration and a pnnp configuration. Each segment of the plurality of segments can have about a same length, and wherein the RF line crossing can have the same length. Each segment except the crossing segment of the plurality of segments can be connected to the first RF line and the second RF line.

In general, in one aspect, an optical modulator includes a first Radio Frequency (RF) line and a second RF line; an optical waveguide along a length of the modulator with an input and an output; and a plurality of segments along the length including a first set of pn junctions, an RF line crossing at a crossing segment, and a second set of pn junctions, wherein the first set of pn junctions and the second set of pn junctions have an inversion of their respective orientation at the RF line crossing, wherein each of the first RF line and the second RF line extend along the length and cross one another at the RF line crossing, and wherein a geometry of the RF line crossing includes any of a length of unloaded lines, a width of the unloaded lines, metal features around the RF line crossing, and an angle of crossing lines connected to respective unloaded lines, and wherein part or all of the geometry is selected such that one or more characteristics of the crossing segment are similar to corresponding one or more characteristics of modulator segments of the plurality of segments. The one or more characteristics can include any capacitance, inductance, impedance, propagation speed, and dielectric constant. A location of the crossing segment can be based on an average loss or sum of voltages over a band of interest. A location of the crossing segment can be selected based on RF imbalance caused by the RF line crossing. The crossing segment can be located closer to the input than the output along the length. Each segment in the first set of pn junctions can have a same orientation, and each segment in the second set of pn junctions can have a same orientation different from the orientation of the first set of pn junctions. One or more segments in the first set of pn junctions can have a different orientation from one another, and one or more segments in the second set of pn junctions can have a different orientation from one another. The respective orientation in each of the first set of pn junctions and the second set of pn junctions can be one of a nppn configuration and a pnnp configuration. Each segment of the plurality of segments can have about a same length, and wherein the RF line crossing can have the same length.

In general, in one aspect, the invention relates to an optoelectronic integrated circuit. The optoelectronic integrated circuit includes (i) a first back-to-back-junction component (BBJC) and a second BBJC that conform to a first fabrication pattern, where the first BBJC includes a first A-type p-n junction (APNJ) in series with a first B-type p-n junction (BPNJ), where the second BBJC includes a second APNJ in series with a second BPNJ, and (ii) an optical component conforming to a second fabrication pattern that superimposes the first fabrication pattern, where the optical component overlaps the first APNJ and the second APNJ to define a first p-type overlap region and a first n-type overlap region, where the optical component overlaps the first BPNJ and the second BPNJ to define a second p-type overlap region and a second n-type overlap region. The APNJs and BPNJs may be identified based on overlapping with separate arms of the optical component. The first APNJ, the first BPNJ, the second APNJ, and the second BPNJ are disposed along respective directions, where metal bridges may be used, such that (i) the first p-type overlap region and the second p-type region are substantially same size, independent of a fabrication misalignment amount of the first fabrication pattern with respect to the second fabrication pattern, and (ii) the first n-type overlap region and the second n-type region are substantially same size independent of the fabrication misalignment amount of the first fabrication pattern with respect to the second fabrication pattern.

In general, in one aspect, the invention relates to an optical modulator circuit. The optical modulator circuit includes (i) a first electrode and a second electrode that are adapted to propagate a modulating voltage of the optical modulator circuit, (ii) a first back-to-back-junction component (BBJC) and a second BBJC that are connected to the first electrode and the second electrode to receive the modulating voltage, where the first BBJC includes a first A-type p-n junction (APNJ) in series with a first B-type p-n junction (BPNJ), where the second BBJC includes a second APNJ in series with a second BPNJ, where the first BBJC and the second BBJC conform to a first fabrication pattern, and (iii) a first optical waveguide and a second optical waveguide that are adapted to propagate an optical signal of the optical modulator circuit, where the first optical waveguide and the second optical waveguide conform to a second fabrication pattern that superimposes the first fabrication pattern, where the first optical waveguide overlaps the first APNJ and the second APNJ to define a first p-type overlap region and a first n-type overlap region, where the second optical waveguide overlaps the first BPNJ and the second BPNJ to define a second p-type overlap region and a second n-type overlap region. The APNJs and BPNJs may be identified based on overlapping with the first optical waveguide and second optical waveguide. The first APNJ, the first BPNJ, the second APNJ, and the second BPNJ are disposed along respective directions, where metal bridges may be used, such that (i) the first p-type overlap region and the second p-type region are substantially same size, independent of a fabrication misalignment amount of the first fabrication pattern with respect to the second fabrication pattern, and (ii) the first n-type overlap region and the second n-type region are substantially same size independent of the fabrication misalignment amount of the first fabrication pattern with respect to the second fabrication pattern. The respective directions reduce an imbalance in the modulation of the optical signal using the modulating voltage from the first electrode and the second electrode.

In general, in one aspect, the invention relates to a method for fabricating an optoelectronic integrated circuit. The method includes (ii) forming a first back-to-back-junction component (BBJC) and a second BBJC according to a first fabrication pattern, where the first BBJC includes a first A-type p-n junction (APNJ) in series with a first B-type p-n junction (BPNJ), where the second BBJC includes a second APNJ in series with a second BPNJ, and (ii) forming an optical component according to a second fabrication pattern that superimposes the first fabrication pattern, where the optical component overlaps the first APNJ and the second APNJ to define a first p-type overlap region and a first n-type overlap region, where the optical component overlaps the first BPNJ and the second BPNJ to define a second p-type overlap region and a second n-type overlap region. The APNJs and BPNJs may be identified based on overlapping with separate arms of the optical component. The first APNJ, the first BPNJ, the second APNJ, and the second BPNJ are disposed along respective directions, where metal bridges may be used, such that (i) the first p-type overlap region and the second p-type region are substantially same size independent of a fabrication misalignment amount of the first fabrication pattern with respect to the second fabrication pattern, and (ii) the first n-type overlap region and the second n-type region are substantially same size independent of the fabrication misalignment amount of the first fabrication pattern with respect to the second fabrication pattern.

Other aspects of the invention will be apparent from the following description and the appended claims.

BRIEF DESCRIPTION OF THE DRAWINGS

FIGS. 1.1 and 1.2 show fabrication pattern diagrams in accordance with one or more embodiments of the invention.

FIGS. 2.1, 2.2, and 2.3 shows top view and side view diagrams in accordance with one or more embodiments of the invention.

FIG. 4 shows a fabrication pattern of a MZ modulator based on the BBJC X and pnnp component depicted in FIG. 2.1.

FIG. 5 shows the fabrication pattern of a MZ modulator similar to FIG. 4 with the exception that the p-n junctions of each BBJC are physically laid out in a p-n-p-n doping type sequence while being electrically connected as a nppn component.

FIG. 6 shows the fabrication pattern of a MZ modulator based on the BBJC Y, BBJC Z, pnnp component, and pnnp component depicted in FIG. 2.2.

FIG. 7 shows the fabrication pattern of a MZ modulator based on the BBJC Y, BBJC W, pnnp component, and nppn component depicted in FIG. 2.3.

FIG. 8 shows the fabrication pattern of a variation of the optical modulator circuit depicted in FIGS. 6 and 7.

FIG. 9 shows an example of routing variation in the bias voltages for the optical modulator circuit with the pnnp/nppn hybrid series-push-pull (SPP).

FIGS. 15.1 and 15.2 show close-up views of the RF line crossing design with FIG. 15.1 showing a top view and FIG. 15.2 showing a perspective view with an equivalent circuit diagram.

FIGS. 17.1 and 17.2 show graphs illustrating per unit length characteristics of the modulator segment (FIG. 17.1) with the RF line crossing relative to the modulator segment (FIG. 17.2) without the RF line crossing.

FIG. 17.3 shows a graph of a 44-segment modulator comparing the performance of the modulator and the modulator.

DETAILED DESCRIPTION

Figure 3:
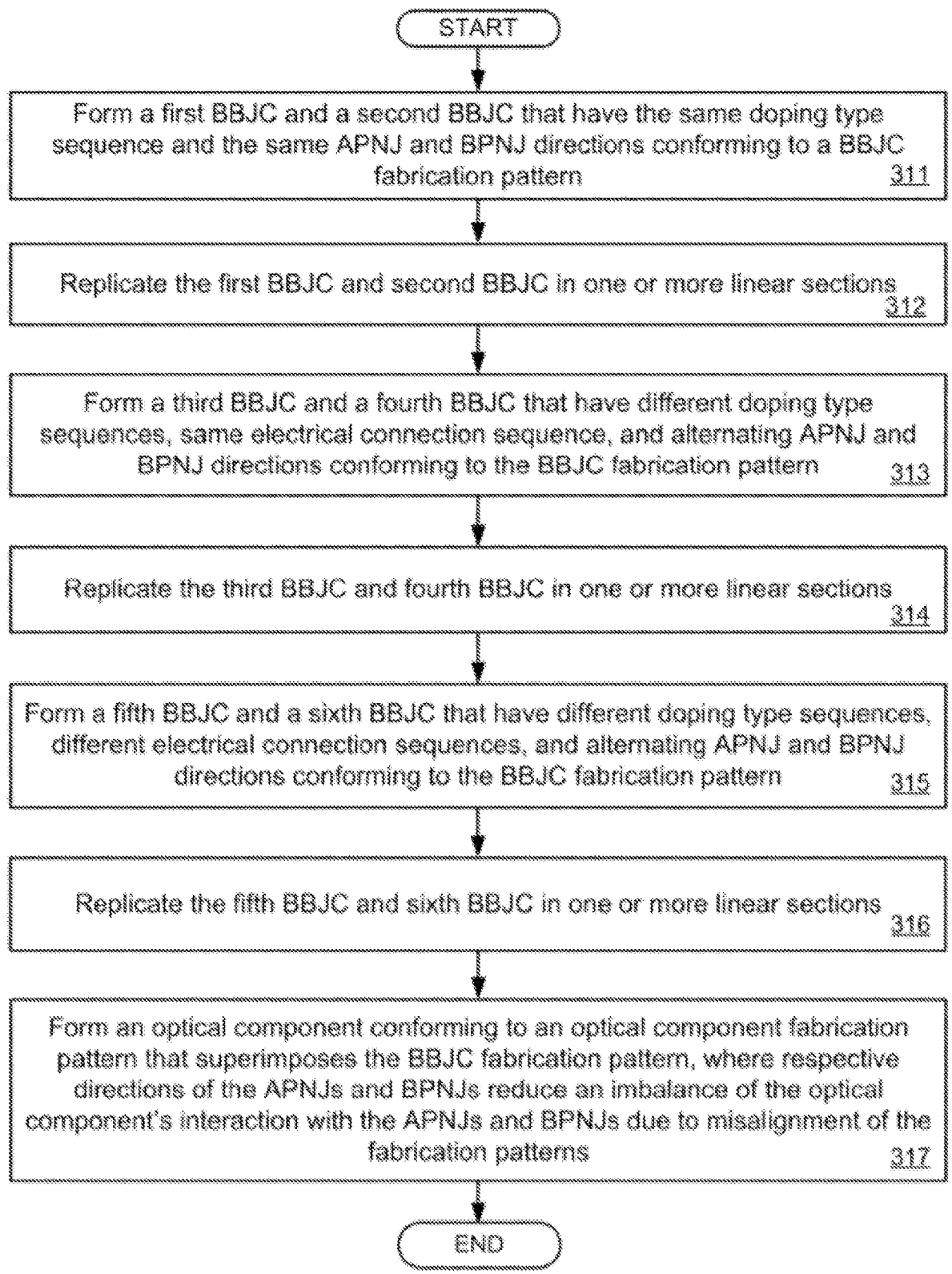
FIG. 3 shows a method flowchart in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, three black solid collinear dots indicate that additional components similar to the components before and after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide an optoelectronic integrated circuit having a group of back-to-back-junction components (BBJCs) overlapped by and aligned to an optical component. The BBJC are disposed in the optoelectronic integrated circuit according to a layout that reduces a misalignment effect with respect to the optical component. In one or more embodiments, the BBJC and the optical component form two arms of an optical modulator. The p-type and n-type regions of p-n junctions are geometrically swapped between the BBJC. For example, each arm of the optical modulator contains substantially the same number of (i) BBJCs having p-n junctions with p-type regions at one side of the optical component and (ii) BBJCs having p-n junctions with p-type regions at the opposite side of the optical component. Accordingly, misalignment of the BBJCs with respect to the optical component results in substantially the same effect in both arms to reduce the misalignment effect on the optical modulator.

Also, in general, an optical modulator includes multiple segments including modulator segments and a Radio Frequency (RF) crossing segment where RF lines extending a length of the modulator cross one another. The present disclosure includes optimization of one or more of a geometry of the RF crossing and a location of the RF crossing segment along the length. The geometry is selected so that the RF crossing segment appears as another segment having similar characteristics as modulator segments. The location of the RF crossing segment is selected to balance out fabrication error and phase efficiency.

Optical Modulator Robust to Fabrication Errors

FIG. 1.1 shows a fabrication pattern diagram of an optoelectronic integrated circuit (100) in accordance with one or more embodiments of the invention. Throughout this disclosure, the relative positions and directions of components depicted in a fabrication pattern diagram correspond to physical layout positions and directions on an integrated circuit chip or dice. In one or more embodiments of the invention, one or more of the elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the optoelectronic integrated circuit (100) includes a sequence of back-to-back junction components (BBJCs) (e.g., BBJC A (101), BBJC B (102), etc.) disposed in parallel and conforming to a BBJC fabrication pattern. As used herein, the BBJC fabrication pattern is the pattern of semiconductor, oxide, metal, or other material layers formed on the wafer, die, and/or chip based on the layout of the BBJC. Specifically, a BBJC is an electronic component having two p-n junctions electrically connected as either a pnnp component or a nppn component. In other words, the BBJC may have two different electrical connection sequences (i.e., pnnp sequence or nppn sequence). The BBJC of the pnnp sequence (i.e., a pnnp component) has the n-type regions of the two p-n junctions electrically connected together. The BBJC of the nppn sequence (i.e., a nppn component) has the p-type regions of the two p-n junctions electrically connected together.

While the electrical connection sequence of the BBJC refers to and is based on the electrical connection of the p-n junctions, the doping type sequence of a BBJC is a physical sequence of doping types (i.e., n-type or p-type) according to the layout of the BBJC's doped regions (i.e., n-type region and p-type region).

The BBJC A (101) includes a p-n junction A (104) in series with a p-n junction B (105) that are formed from a physical layout sequence of doped regions (111), (112), (113), and (114). The doping type sequence of the BBJC A (101) is a sequence x-y-z-w where x, y, z, and w denote the doping types (i.e., n-type or p-type) of the doped regions (111), (112), (113), and (114), respectively. In some embodiments, an intervening non-doped region may exist between the doped regions (112) and (113). Similarly, the BBJC B (102) includes a p-n junction C (106) in series with a p-n junction D (107) that are formed from a physical layout sequence of doped regions (115), (116), (117), and (118). The doping type sequence of the BBJC B (102) is a sequence q-p-r-s where q, p, r, and s denote the doping types (i.e., n-type or p-type) of the doped regions (115), (116), (117), and (118), respectively. In some embodiments, an intervening non-doped region may exist between the doped regions (116) and (117). For example, the doping type sequence of the BBJC A (101) and/or BBJC B (102) may be n-p-n-p, p-n-n-p, n-p-p-n, p-n-p-n.

In one or more embodiments, the doped regions (111), (112), (113), (114), (115), (116), (117), and (118) are electrically interconnected (not explicitly shown) via contiguous same-type doped regions and/or via metal bridges to form respective pnnp or nppn component. In particular, the doping type sequence and the electrical connection sequence relate to the fabrication pattern of the BBJC A (101) and the BBJC B (102) (more particularly, of the doped regions (111), (112), (113), (114), (115), (116), (117), and (118)), which is based on one or more lithographic masks used to perform the selective doping for the BBJC A (101) and the BBJC B (102). Various doping type sequences and electrical connection sequences of the doped regions (111), (112), (113), (114), (115), (116), (117), and (118) are described in reference to FIGS. 2.1-2.3 below.

Further, as shown in FIG. 1.1, the optoelectronic integrated circuit (100) includes an optical component (103) that conforms to an optical component fabrication pattern. As used herein, the optical component fabrication pattern is the pattern of semiconductor, oxide, metal, or other material layers formed on the wafer, die, and/or chip based on the layout of the optical component. In particular, the fabrication pattern of the optical component (103) superimposes the fabrication pattern of the BBJC A (101) and the BBJC B (102). The two fabrication patterns have a misalignment (302) with respect to a division line (301) of the optical component (103). In particular, the p-n junction B (105) and p-n junction D (107) are designed to coincide with the division line (301) according to the layout of the optoelectronic integrated circuit (100). For example, the division line (301) may be specified by a circuit designer in the layout of the optoelectronic integrated circuit (100) to divide the optical component (103) into portions overlapped by doping regions of the opposite types. During fabrication, the misalignment (302) results from a shifting between the aforementioned lithographic masks.

Depending on which side an overlap region is with respect to the misalignment (302) or the misaligned p-n junction, the misalignment (302) causes the overlap of the optical component (103) and the doped regions to have different sizes than what is specified by the circuit designer. For example, the optical component (103) (or the fabrication pattern thereof) overlaps the doped regions (111) and (112) (or the fabrication pattern thereof) to define two different-size and opposite-type overlap regions (highlighted) separated by the p-n junction A (104). Similarly, the optical component (103) (or the fabrication pattern thereof) overlaps the doped regions (113) and (114) (or the fabrication pattern thereof) to define two different-size and opposite-type overlap regions (highlighted) separated by the p-n junction B (105). The different-size and opposite-type overlap regions in the BBJC A (101) may result in an overlap region size imbalance between the two p-n junctions (i.e., p-n junction A (104), p-n junction B (105)) for either the p-type region or the n-type region. The overlap regions of the BBJC B (102) may also result in another overlap region size imbalances as the BBJC A (101).

In one or more embodiments, the p-n junction A (104), p-n junction B (105), p-n junction C (106), and p-n junction D (107) are disposed along respective directions such that (i) the combined p-type overlap region of the p-n junction A (104) and p-n junction C (106) has a substantially same size as the combined p-type overlap region of the p-n junction B (105) and p-n junction D (107) independent of the misalignment (302), and (ii) the combined n-type overlap region of the p-n junction A (104) and p-n junction C (106) has a substantially same size as the combined n-type overlap region of the p-n junction B (105) and p-n junction D (107) independent of the misalignment (302). As used herein, a direction of a p-n junction is the geometric direction from the p-type region to the n-type region according to the layout of the doped regions.

In one or more embodiments, the optical component (103) includes two sections, referred to as an arm A and an arm B. For example, one section overlaps the p-n junction A (104) and p-n junction C (106) while another section overlaps the p-n junction B (105) and p-n junction D (107). In this context, the p-n junction A (104) and p-n junction C (106) are referred to as A-type p-n junctions (APNJs) while the p-n junction B (105) and p-n junction D (107) are referred to B-type p-n junctions (BPNJs). In other words, the APNJ is an p-n junction overlapped by the arm A while the BPNJ is an p-n junction overlapped by the arm B. Specifically, the p-n junction A (104) and p-n junction C (106) form a first group (i.e., A-type) of p-n junctions while the p-n junction B (105) and p-n junction D (107) form a second group (i.e., B-type) of p-n junctions.

Various directions of the p-n junction A (104), p-n junction B (105), p-n junction C (106), and p-n junction D (107) to reduce the effect of misalignment induced overlap region size imbalance, in particular along the cross section A (120) and cross section B (121), are described in reference to FIGS. 2.1-2.3 below.

FIG. 1.2 shows a fabrication pattern diagram of an optical modulator circuit (200) in accordance with one or more embodiments of the invention. In one or more embodiments of the invention, one or more of the elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the optical modulator circuit (200) is an integrated circuit that is a superset of the optoelectronic integrated circuit (100) with additional components denoted according to the legend (210). Although not explicitly shown, in one or more embodiments, a radio frequency (RF) termination is connected to the electrodes on the opposite end from the bias voltages. Specifically, a common connection (213) to all p-n junctions of the BBJCs (e.g., BBJC A (101), BBJC B (102), etc.)) is adapted to receive a bias voltage for setting up depletion regions of the p-n junctions. The two ends of each BBJC (e.g., BBJC A (101), BBJC B (102), etc.)) are connected to an electrode A and electrode B, respectively, that are adapted to receive a modulating voltage. In particular, p-n junctions that overlap an arm A (211) of the silicon waveguide are APNJs. Similarly, p-n junctions that overlap an arm B (212) of the silicon waveguide are BPNJs. The arm A (211) and arm B (212) correspond to the two sections of the optical component (103) depicted in FIG. 1.1 above. Specific connections from the APNJs and BPNJs to the electrode A and electrode B are not explicitly shown in FIG. 1.2. Various electrode connection configurations for the APNJs and BPNJs are described in reference to FIGS. 2.1-11 below. The modulating voltage corresponds to input data (i.e., Data IN) which modulates the depletion region widths of the APNJs and BPNJs. The free carrier density in the p-n junctions being modulated translates into a modulation of the refractive index of the p-n junctions and to a phase modulation of an optical signal propagating from LI to LO along the arm A (211) and arm B (212) of the silicon waveguide. By merging the arm A (211) and arm B (212) in an interferometer configuration, the optical signal output (i.e., LO) is encoded with information from the input data (i.e., Data IN).

As noted above, the p-n junctions in the APNJs and BPNJs are disposed in respective directions to reduce the effect of misalignment induced overlap region size imbalance in the optoelectronic integrated circuit (100) and an imbalance in the modulation efficiency between the first group (i.e., A-type) and second group (i.e., B-type) of p-n junctions (i.e., APNJs and BPNJs). For a balanced operation of the optical modulator circuit (200), the combined p-type overlap region of the first group p-n junctions (i.e., APNJs) has a substantially same size as the combined p-type overlap region of the second group p-n junctions (i.e., BPNJs) independent of the misalignment (302). In addition, the combined n-type overlap region of the first group p-n junctions (i.e., APNJs) has a substantially same size as the combined n-type overlap region of the second group p-n junctions (i.e., BPNJs) independent of the misalignment (302). In other words, the respective directions of the first group and second group p-n junctions (i.e., APNJs and BPNJs) are designated in the layout of the optical modulator circuit (200) to reduce the misalignment induced imbalance resulting from modulating the optical signal using the modulating voltage from the electrode A and electrode B.

In one or more embodiments, the optical modulator circuit (200) is fabricated in silicon as a Mach-Zehnder (MZ) modulator used for light modulation in optical telecommunication applications. Unlike lithium niobate or other material that have electro-optic properties suitable for optical signal modulation, modulation in silicon waveguides is achieved based on the dependency of the refractive index to the free carrier density in the depletion region. Accordingly, by constructing a p-n junction within an optical waveguide and by applying a time-varying reverse voltage, the depletion region of the p-n junction (in particular, the free carrier density) may be modulated, leading to a modulation of the refractive index. In one or more embodiments, the direct current (DC) portion of the time-varying reverse voltage is supplied by the bias voltage while the alternating current (AC) portion of the time-varying reverse voltage is supplied by the modulating voltage.

In the MZ modulator, the presence of free carriers decreases the refractive index for both electrons and holes. The p-n junction is located in the silicon waveguide and modulation of the depletion width of this p-n junction affects an overlapping portion of the optical mode propagating in the waveguide. Accurate positions of the p-n junction within the optical waveguide improves the modulation performance. P-type and n-type dopants are implanted at proper locations defined by lithographic masks aligned over the already defined waveguides. For example, the alignment, performed over multiple optoelectronic integrated circuits of the entire wafer, may have an accuracy of approximately 50 nm (nanometer) while the waveguide may have a width of approximately 400 to 500 nm. Compared to the width of the waveguide, the alignment error may not be negligible and may therefore cause a significant variation in the modulation efficiency across the wafer.

As an example, each arm of the MZ modulator (e.g., arm A (211), arm B (212)) with the associated electrode may be several mm (millimeter) long to produce the designed phase modulation amplitude. For operation at high frequency (i.e. 10's of GHz (giga-hertz)), the MZ modulator arms are implemented using radio frequency (RF) traveling-wave electrodes acting as RF transmission lines. The traveling-wave RF electrodes are elongated electrodes connected to p-n junctions for transmitting the modulation voltage(s). By way of this connection, the capacitance of the p-n junctions adds to the capacitance of the elongated electrodes, which is referred to as the capacitance loading. The capacitance loading results in a characteristic impedance matching with respect to the input driver circuit. In addition, the capacitance loading results in a group velocity matching with respect to the optical waves propagating in the optical waveguides.

As shown in FIG. 1.2, the p-n junctions of the MZ modulator may be divided in segments that connect periodically (or at specific locations) to the RF traveling-wave electrodes to receive the modulation voltage from the input driver circuit. In other words, the RF traveling-wave electrodes propagate the input data (i.e., Data IN) as RF traveling-wave to each p-n junction segment (i.e., one or more BBJCs) along the length of the MZ modulator arms. In particular, the RF traveling-wave is propagated along the length of the arms in a push-pull operation where the phase changes of the optical signal in both arms are in opposite directions. The push-pull operation reduces frequency chirp in the optical signal output (i.e., LO) of the MZ modulator. In one or more embodiments, a single input driver circuit is advantageously used to drive input data (i.e., Data IN) to both arms connected by BBJCs. In particular, the p-n junctions of the two MZ modulator arms are connected back-to-back (i.e., with the p (or n) side of the two diodes electrically connected together) in the SPP configuration. This circuit configuration is a series-push-pull (SPP) configuration.

FIGS. 2.1-2.3 show top view and side view diagrams in accordance with one or more embodiments of the invention. In the side view diagrams, the semiconductor material layers (i.e., waveguides and doping regions) are shown in two-dimensional cross sections while the conducting layers (i.e., metal bridges and electrodes) are shown schematically as line segments. In particular, the line segments represent electrical connection but not physical layout. The top view and side view diagrams correspond to the fabrication pattern of the optoelectronic integrated circuit (100) and optical modulator circuit depicted in FIGS. 1.1 and 1.2 above. In particular, the side view diagrams illustrate various combinations of doping type sequences, electrical connection sequences, and p-n junction directions to reduce the effect of misalignment induced overlap region size imbalance, in particular along the cross section A (120) and cross section B (121) depicted in FIG. 1.1 above.

FIG. 2.1 shows a side view (350) and a top view (360) of a BBJC X (324) according to the legend (300). In one or more embodiments of the invention, the BBJC X (324) corresponds to both the BBJC A (101) and BBJC B (102) (depicted in FIGS. 1.1. and 1.2 above) that have the same doping type sequence. Accordingly, the side view (350) corresponds to both the cross section A (120) and the cross section B (121) depicted in FIG. 1.1 above.

As shown in FIG. 2.1, the BBJC X (324) has the doping type sequence n-p-n-p to form the APNJ (334) and BPNJ (335). In particular, the APNJ (334) and BPNJ (335) have the same p-n junction direction denoted by the arrows of the p-n junction icons. The APNJ (334) and BPNJ (335) are electrically connected into a pnnp component (364) via the metal bridge (226). In other words, the metal bridge (226) is used to form a pnnp electrical connection sequence. Correspondingly in FIGS. 1.1 and 1.2, the BBJC A (101) and BBJC B (102) have the same pnnp electrical connection sequence and have the same n-p-n-p doping type sequence. In addition, the p-n junction A (104), p-n junction B (105), p-n junction C (106), and p-n junction D (107) are all disposed in the same direction.

Further as shown in FIG. 2.1, the electrode A (303), electrode B (304), waveguide A (311), waveguide B (312), division line (301), and misalignment (302) correspond respectively to the electrode A, electrode B, arm A (211), arm B (212), division line (301), and misalignment (302) depicted in FIG. 1.1 above. In addition, the n-type overlap region (353) and p-type overlap region (354) correspond to the two different-size and opposite-type overlap regions separated by the p-n junction A (104), as depicted in FIG. 1.1 above. Similarly, the n-type overlap region (355) and p-type overlap region (356) correspond to the two different-size and opposite-type overlap regions separated by the p-n junction B (105), as depicted in FIG. 1.1 above. The different-size overlap regions merely result in the optical mode interacting with a larger portion of p-type material than n-type material on both the waveguide A (311) and waveguide B (312). Independent of the different-size overlap regions, the optical mode still interacts with substantially same amount (e.g., within 10% or other pre-determined amount) of p-type material on both the waveguide A (311) and the waveguide B (312), as well as interacts with substantially same amount (e.g., within 10% or other pre-determined amount) of n-type material on both the waveguide A (311) and the waveguide B (312). Accordingly, the same directions of the APNJs and BPNJs (i.e., p-n junction A (104), p-n junction B (105), p-n junction C (106), p-n junction D (107)) reduce the imbalance of the modulation strength incurred in optical arms A and B.

The top view (360) shows a SPP configuration in which each segment (e.g., BBJC X (324), BBJC Y (325), etc.) contains a pnnp component with each p-doped region on the same side of the overlapped waveguide, and with each n-doped region on the other same side of the overlapped waveguide, for both MZ modulator arms. The BBJC X (324) is highlighted in the top view (360) according to the legend (300). The BBJC Y (325) and BBJC X (324) are mirror image to each other (with respect to an adjoining boundary) in the top view (360) and both have the same cross section view (350). As noted above, the impact of a misalignment of the doped regions is substantially the same (e.g., within 10% or other pre-determined amount) for both MZ modulator arms. According to the legend (300), two levels of metal are used to fabricate the BBJC X (324). Specifically, the first level metal is used to electrically contact the doped regions (using a set of appropriate vias) while the second level metal is used to form the electrode A (303) and electrode B (304). The metal bridges may be formed in one or more of the metal layers using another set of appropriate vias.

Although the description of FIG. 2.1 applied to FIG. 1.1 above is based on a single doping sequence n-p-n-p for both the BBJC A (101) and BBJC B (102), the optoelectronic integrated circuit (100) may also be based on the BBJC A (101) and BBJC B (102) having the same doping type sequence p-n-p-n. Further, although the misalignment (302) represents same amount of misalignments for both the p-type and n-type regions, the p-type region and the n-type region may have a different amount of misalignment.

FIG. 2.2 shows a side view of a BBJC Y (321) and a BBJC Z (322) according to the legend (310). In one or more embodiments of the invention, the BBJC Y (321) and BBJC Z (322) correspond to the BBJC A (101) and BBJC B (102), respectively, depicted in FIGS. 1.1. and 1.2 above. Accordingly, the BBJC Y (321) and BBJC Z (322) correspond to the cross section A (120) and the cross section B (121), respectively, depicted in FIG. 1.1 above. In particular, the BBJC Y (321) and BBJC Z (322), thus the BBJC A (101) and BBJC B (102), have different and opposite doping type sequences p-n-n-p and n-p-p-n. Accordingly, the APNJ Y (330) and BPNJ Z (333) are disposed in the same direction, while APNJ Z (332) and BPNJ Y (331) are disposed in the same direction opposite to the direction of the APNJ Y (330) and BPNJ Z (333).

As shown in FIG. 2.2, the APNJ Y (330) and BPNJ Y (331) have opposite p-n junction directions denoted by the arrows of the p-n junction icons. The APNJ Y (330) and BPNJ Y (331) are electrically connected into a pnnp component (361) via the contiguous n-type doped region. In other words, the contiguous n-type doped region is used to form a pnnp electrical connection sequence. Further, the APNJ Z (332) and BPNJ Z (333) also have opposite p-n junction directions denoted by the arrows of the p-n junction icons. The APNJ Z (332) and BPNJ Z (333) are electrically connected into a pnnp component (362) via the metal bridges (227). In other words, the metal bridges (227) is used to form a pnnp electrical connection sequence. Correspondingly in FIGS. 1.1 and 1.2, the BBJC A (101) and BBJC B (102) have the same pnnp electrical connection sequence but have the different and opposite doping type sequences p-n-n-p and n-p-p-n, respectively. In addition, the p-n junction A (104) and p-n junction D (107) are disposed in the same direction, while the p-n junction B (105) and p-n junction C (106) are disposed in the same direction opposite to the direction of the p-n junction A (104) and p-n junction D (107).

Further as shown in FIG. 2.2, the electrode A (303), electrode B (304), waveguide A (311), waveguide B (312), division line (301), and misalignment (302) respectively correspond to the electrode A, electrode B, arm A (211), arm B (212), division line (301), and misalignment (302) depicted in FIG. 1.2 above. Further, the n-type overlap region (342) and p-type overlap region (341) correspond to the two different-size and opposite-type overlap regions separated by the p-n junction A (104), as depicted in FIG. 1.1 above. Similarly, the n-type overlap region (343) and p-type overlap region (344) correspond to the two different-size and opposite-type overlap regions separated by the p-n junction B (105), as depicted in FIG. 1.1 above. In addition, the n-type overlap region (345) and p-type overlap region (346) correspond to the two different-size and opposite-type overlap regions separated by the p-n junction C (106), as depicted in FIG. 1.1 above. Similarly, the n-type overlap region (348) and p-type overlap region (347) correspond to the two different-size and opposite-type overlap regions separated by the p-n junction D (107), as depicted in FIG. 1.1 above.

In the waveguide A (311), the optical mode interacts with a combination of p-type region (341) and p-type region (346). In the waveguide B (312), the optical mode interacts with a combination of p-type region (344) and p-type region (347). Independent of the misalignment (302), the combination of p-type overlap region (341) and p-type overlap region (346) is substantially the same size (e.g., within 10% or other pre-determined amount) as the combination of p-type overlap region (344) and p-type overlap region (347). In other words, the optical mode interacts with same amount (e.g., within 10% or other pre-determined amount) of p-type material on both the waveguide A (311) and waveguide B (312).

In the waveguide A (311), the optical mode interacts with a combination of n-type region (342) and n-type region (345). In the waveguide B (312), the optical mode interacts with a combination of n-type region (343) and n-type region (348). Independent of the misalignment (302), the combination of n-type overlap region (342) and n-type overlap region (345) is substantially the same size (e.g., within 10% or other pre-determined amount) as the combination of n-type overlap region (343) and n-type overlap region (348). In other words, the optical mode interacts with same amount (e.g., within 10% or other pre-determined amount) of n-type material on both the waveguide A (311) and waveguide B (312).

Accordingly, the combination of doping type sequences, electrical connection sequences, and p-n junction directions of the APNJs and BPNJs reduces the imbalance of the modulation strength incurred in optical arms A and B.

Although the description of FIG. 2.2 is based on the doping sequences p-n-n-p and n-p-p-n for the BBJC Y (321) and BBJC Z (322), respectively, the balanced operation of the optoelectronic integrated circuit may also be based on the BBJC Y (321) and BBJC Z (322) having the doping type sequences n-p-p-n and p-n-n-p, respectively. Further, although the misalignment (302) represents same amount of misalignments for both the p-type and n-type regions, the p-type region and the n-type region may have a different amount of misalignment.

FIG. 2.3 shows a side view of a BBJC Y (321) and a BBJC W (323) according to the legend (310). In one or more embodiments of the invention, the BBJC Y (321) and BBJC W (323) correspond to the BBJC A (101) and BBJC B (102), respectively, depicted in FIGS. 1.1. and 1.2 above. Accordingly, the BBJC Y (321) and BBJC W (323) correspond to the cross section A (120) and the cross section B (121), respectively, depicted in FIG. 1.1 above. In particular, the BBJC Y (321) and BBJC W (323), thus the BBJC A (101) and BBJC B (102), have different and opposite doping type sequences p-n-n-p and n-p-p-n. Accordingly, the APNJ Y (330) and BPNJ W (337) are disposed in the same direction, while APNJ W (336) and BPNJ Y (331) are disposed in the same direction opposite to the direction of the APNJ Y (330) and BPNJ W (337).

As shown in FIG. 2.3, the APNJ Y (330) and BPNJ Y (331) have opposite p-n junction directions denoted by the arrows of the p-n junction icons. The APNJ Y (330) and BPNJ Y (331) are electrically connected into a pnnp component (361) via the contiguous n-type doped region. In other words, the contiguous n-type doped region is used to form a pnnp electrical connection sequence. Further, the APNJ W (336) and BPNJ W (337) also have opposite p-n junction directions denoted by the arrows of the p-n junction icons. The APNJ W (336) and BPNJ W (337) are electrically connected into a nppn component (363) via the contiguous p-type doped region. In other words, the contiguous p-type doped region is used to form a nppn electrical connection sequence. The metal bridge (228) connects respective n-type doped regions of the nppn component (363) to the electrode A (303) and electrode B (304). Correspondingly in FIGS. 1.1 and 1.2, the BBJC A (101) and BBJC B (102) have the different and opposite electrical connection sequences and have the different and opposite doping type sequences. In addition, the p-n junction A (104) and p-n junction D (107) are disposed in the same direction, while the p-n junction B (105) and p-n junction C (106) are disposed in the same direction opposite to the direction of the p-n junction A (104) and p-n junction D (107).

Further, as shown in FIG. 2.3, the electrode A (303), electrode B (304), waveguide A (311), waveguide B (312), division line (301), and misalignment (302) respectively correspond to the electrode A, electrode B, arm A (211), arm B (212), division line (301), and misalignment (302) depicted in FIG. 1.2 above. Further, the n-type overlap region (342) and p-type overlap region (341) correspond to the two different-size and opposite-type overlap regions separated by the p-n junction A (104), as depicted in FIG. 1.1 above. Similarly, the n-type overlap region (343) and p-type overlap region (344) correspond to the two different-size and opposite-type overlap regions separated by the p-n junction B (105), as depicted in FIG. 1.1 above. In addition, the n-type overlap region (349) and p-type overlap region (350) correspond to the two different-size and opposite-type overlap regions separated by the p-n junction C (106), as depicted in FIG. 1.1 above. Similarly, the n-type overlap region (352) and p-type overlap region (351) correspond to the two different-size and opposite-type overlap regions separated by the p-n junction D (107), as depicted in FIG. 1.1 above.

In the waveguide A (311), the optical mode interacts with a combination of p-type overlap region (341) and p-type overlap region (350). In the waveguide B (312), the optical mode interacts with a combination of p-type overlap region (344) and p-type overlap region (351). Independent of the misalignment (302), the combination of p-type overlap region (341) and p-type overlap region (350) is substantially the same size (e.g., within 10% or other pre-determined amount) as the combination of p-type overlap region (344) and p-type overlap region (351). In other words, the optical mode interacts with same amount (e.g., within 10% or other pre-determined amount) of p-type material on both the waveguide A (311) and waveguide B (312).

In the waveguide A (311), the optical mode interacts with a combination of n-type overlap region (342) and n-type overlap region (349). In the waveguide B (312), the optical mode interacts with a combination of n-type overlap region (343) and n-type overlap region (352). Independent of the misalignment (302), the combination of n-type overlap region (342) and n-type overlap region (349) is substantially the same size (e.g., within 10% or other pre-determined amount) as the combination of n-type overlap region (343) and n-type overlap region (352). In other words, the optical mode interacts with same amount (e.g., within 10% or other pre-determined amount) of n-type material on both the waveguide A (311) and waveguide B (312).

Accordingly, the combination of doping type sequences, electrical connection sequences, and p-n junction directions of the APNJs and BPNJs reduce the imbalance of the modulation strength incurred in optical arms A and B.

Although the description of FIG. 2.3 is based on the doping sequences p-n-n-p and n-p-p-n for the BBJC Y (321) and BBJC W (323), respectively, the balanced operation of the optoelectronic integrated circuit may also be based on the BBJC Y (321) and BBJC W (323) having the doping type sequences n-p-p-n and p-n-n-p, respectively. Further, although the misalignment (302) represents same amount of misalignments for both the p-type and n-type regions, the p-type region and the n-type region may have different amount of misalignment.

FIG. 3 shows a method flowchart in accordance with one or more embodiments. In one or more embodiments, the method may be used to fabricate the optoelectronic integrated circuit and/or the optical modulator circuit depicted in FIGS. 1.1 and 1.2 above. One or more steps shown in FIG. 3 may be omitted, repeated, and/or performed in a different order among different embodiments of the invention. Accordingly, embodiments of the invention should not be considered limited to the specific number and arrangement of steps shown in FIG. 3.

Initially, in Step 311, a first BBJC and a second BBJC are formed conforming to a BBJC fabrication pattern. In particular, one or more lithographic masks are used to form the first BBJC and the second BBJC according to a same doping type sequence. Further, the one or more lithographic masks dispose a first APNJ and first BPNJ of the first BBJC, and a second APNJ and second BPNJ of the second BBJC along a same direction. Accordingly, the first BBJC and the second BBJC have the same electrical connection sequence (i.e., pnnp sequence or nppn sequence).

In Step 312, the first BBJC and second BBJC are replicated. In one or more embodiments, the replicated BBJCs are disposed along one or more linear sections.

In Step 313, a third BBJC and a fourth BBJC are formed conforming to the BBJC fabrication pattern. In particular, one or more lithographic masks are used to form the third BBJC and the fourth BBJC according to different (e.g., opposite) doping type sequences. Further, the one or more lithographic masks dispose metal layer connections such that the third BBJC and the fourth BBJC have the same electrical connection sequence. In addition, the one or more lithographic masks dispose (i) the first APNJ and the second BPNJ along a first direction, and (ii) the first BPNJ and the second APNJ along a second direction opposite to the first direction.

In Step 314, the third BBJC and fourth BBJC are replicated. In one or more embodiments, the replicated BBJCs are disposed along one or more linear sections. In particular, the replicated third BBJCs have respective APNJs along the first direction, while the replicated fourth BBJCs have respective APNJs along the second direction. In one or more embodiments, the replicated third BBJCs and the replicated fourth BBJCs are disposed in the one or more linear sections based on a pre-determined direction alternating sequence.

In Step 315, a fifth BBJC and a sixth BBJC are formed conforming to the BBJC fabrication pattern. In particular, one or more lithographic masks are used to form the fifth BBJC and the sixth BBJC according to different (e.g., opposite) doping type sequences. Further, the one or more lithographic masks dispose metal layer connections such that the fifth BBJC and the sixth BBJC have different (e.g., opposite) electrical connection sequence. In addition, the one or more lithographic masks dispose (i) the first APNJ and the second BPNJ along a first direction, and (ii) the first BPNJ and the second APNJ along a second direction opposite to the first direction.

In Step 316, the fifth BBJC and sixth BBJC are replicated. In one or more embodiments, the replicated BBJCs are disposed along one or more linear sections. In particular, the replicated fifth BBJCs have respective APNJs along the first direction, while the replicated sixth BBJCs have respective APNJs along the second direction. In one or more embodiments, the replicated fifth BBJCs and the replicated sixth BBJCs are disposed in the one or more linear sections based on a pre-determined direction alternating sequence.

In Step 317, an optical component is formed conforming to an optical component fabrication pattern that superimposes the BBJC fabrication pattern. The optical component fabrication pattern and the BBJC fabrication pattern may be formed in any sequence during the fabrication. In particular, one or more lithographic masks are used to form the optical component that (i) overlaps the aforementioned APNJs to define a first p-type overlap region and a first n-type overlap region, and (ii) overlaps the aforementioned BPNJs to define a second p-type overlap region and a second n-type overlap region. In one or more embodiments, the first p-type overlap region and the second p-type region are substantially same size (e.g., within 10% or other pre-determined amount) independent of a fabrication misalignment amount of the BBJC fabrication pattern with respect to the optical component fabrication pattern. In one or more embodiments, the first n-type overlap region and the second n-type region are substantially same size (e.g., within 10% or other pre-determined amount) independent of the fabrication misalignment amount of the BBJC fabrication pattern with respect to the optical component fabrication pattern. Accordingly, the respective directions of the APNJs and BPNJs reduce an imbalance in the optical component's interaction with the APNJs and BPNJs due to the fabrication misalignment.

As noted above, one or more of the Steps 311-316 may be omitted. In other words, different combinations of the BBJCs depicted in FIGS. 2.1-2.3 may be formed using the one or more lithographic masks. In one or more embodiments, the Steps 311-316 may be performed simultaneously using the same one or more lithographic masks.\

FIGS. 4-11 show examples in accordance with one or more embodiments of the invention. The examples shown in FIGS. 4-11 implement an optical modulator, such as a Mach-Zehnder (MZ) modulator, based on the fabrication pattern diagrams and method flow chart discussed in reference to FIGS. 1.1-1.2, 2.1-2.3, and 3 above. In particular, the components depicted in FIGS. 4-11 according to legend (400) are examples of the like-named components depicted in FIGS. 1.1-1.2 and 2.1-2.3 above. Although not explicitly shown in FIGS. 4-11, RF termination is connected at the end of the transmission line (electrodes A and B). In one or more embodiments, one or more of the modules and elements shown in FIGS. 4-11 may be omitted, repeated, and/or substituted. Accordingly, embodiments of the invention should not be considered limited to the specific arrangements of modules shown in FIGS. 4-11.

FIG. 4 shows the fabrication pattern of a MZ modulator based on the BBJC X (324) and pnnp component (364) depicted in FIG. 2.1 above. In particular, the APNJs and BPNJs of the MZ modulator are physically oriented along the same direction in the two waveguide arms. For example, the p-n junctions of the BBJC X (324) are physically laid out in a n-p-n-p doping type sequence while being electrically connected as a pnnp component. Connections between the APNJs and BPNJs, and connections between the p-n junctions and the RF traveling-wave electrodes may be realized using on-chip metal layers and contact vias. As the n-type overlap regions shift by substantially the same amount (e.g., within 10% or other pre-determined amount) for both waveguide arms under a misalignment of the fabrication masks, both arms have substantially the same size (e.g., within 10% or other pre-determined amount) n-type overlap regions from all BBJCs as a group. Similarly, as the p-type overlap regions shift by substantially the same amount (e.g., within 10% or other pre-determined amount) for both waveguide arms under the misalignment, both arms have substantially the same size (e.g., within 10% or other pre-determined amount) p-type overlap regions from all BBJCs as a group.

FIG. 5 shows the fabrication pattern of a MZ modulator similar to FIG. 4 with the exception that the p-n junctions of each BBJC are physically laid out in a p-n-p-n doping type sequence while being electrically connected as a nppn component.

FIG. 6 shows the fabrication pattern of a MZ modulator based on the BBJC Y (321), BBJC Z (322), pnnp component (361), and pnnp component (362) depicted in FIG. 2.2 above. In particular, the p-n junction's direction in the different segments changes along the length of each modulating arm. For example, the p-n junctions of the BBJC Y (321) are physically laid out in a p-n-n-p doping type sequence and electrically connected as a pnnp component. In this context, the BBJC Y (321) is referred to as a non-inverted segment. In contrast, the p-n junctions of the BBJC Z (322) are physically laid out in an n-p-p-n doping type sequence while being electrically connected as a pnnp component. In this context, the BBJC Z (322) is referred to as an inverted segment. Accordingly, the optical signal propagates in the p-n junctions oriented in one direction (e.g., the BBJC Y (321) of the non-inverted segment) over half of the arm's length, and propagates in the p-n junctions oriented in the opposite direction (e.g., the BBJC Z (322) of the inverted segment) over the remaining half. As a result of the opposite directions, the effect induced by the misalignment in a non-inverted segment is compensated by an opposite effect induced in a corresponding inverted segment.

As shown in FIG. 6, the p-type region of each top diode (diode overlapped by the top arm) is connected to the electrode A for both the non-inverted and inverted segments, and the p-type region of each bottom diode (diode overlapped by the bottom arm) is connected to the electrode B for both the non-inverted and inverted segments. The MZ modulator may also be implemented using nppn BBJCs where the n-type region of each top diode is connected to the electrode A for both the non-inverted and inverted segments, and the n-type region of each bottom diode is connected to the electrode B for both the non-inverted and inverted segments.

FIG. 7 shows the fabrication pattern of a MZ modulator based on the BBJC Y (321), BBJC W (323), pnnp component (361), and nppn component (363) depicted in FIG. 2.3 above. In particular, the p-n junction's direction in the different segments changes along the length of each modulating arm. For example, the p-n junctions of the BBJC Y (321) are physically laid out in a p-n-n-p doping type sequence and electrically connected as a pnnp component. In this context, the BBJC Y (321) is referred to as a non-inverted segment. In contrast, the p-n junctions of the BBJC W (323) are physically laid out in a n-p-p-n doping type sequence while being electrically connected as a nppn component. In this context, the BBJC W (323) is referred to as an inverted segment. Accordingly, the optical signal propagates in the p-n junctions oriented in one direction (e.g., the BBJC Y (321) of the non-inverted segment) over half of the arm's length, and propagates in the p-n junctions oriented in the opposite direction (e.g., the BBJC W (323) of the inverted segment) over the remaining half. As a result of the opposite directions, the effect induced by the misalignment in a non-inverted segment is compensated by an opposite effect induced in a corresponding inverted segment.

As shown in FIG. 7, for the non-inverted segments, the p-type region of each top diode (diode overlapped by the top arm) is connected to the electrode A and the p-type region of each bottom diode (diode overlapped by the bottom arm) is connected to the electrode B. In contrast, for the inverted segments, the n-type region of each top diode (diode overlapped by the top arm) is connected to the electrode B and the n-type region of each bottom diode (diode overlapped by the bottom arm) is connected to the electrode A. This is referred to as a hybrid pnnp/nppn SPP configuration. The MZ modulator may also be implemented using the opposite structure (i.e., hybrid nppn/pnnp SPP configuration). In the hybrid pnnp/nppn SPP configuration, the BBJC Y (321) is physically laid out in a p-n-n-p doping type sequence and electrically connected as a pnnp component. In contrast, the BBJC W (323) is physically laid out in a n-p-p-n doping type sequence while being electrically connected as a nppn component.

The hybrid pnnp/nppn or nppn/pnnp SPP configuration uses two bias voltages (i.e., bias voltage A, bias voltage B) to polarize the p-n junctions to operate in the depletion mode (reverse bias operation). The use of separate bias voltages may be advantageous in providing an additional parameter to optimize the modulator performances (e.g., frequency response, phase modulation imbalance, etc.).

The hybrid pnnp/nppn or nppn/pnnp SPP configuration allows the diodes to be connected in series using a common doped region (e.g., n-type region for the pnnp segments and p-type region for the nppn segments). Metal layers and contact vias may be used to make the required connections to the proper doped regions and traveling-wave RF electrodes. Bias voltages may also be brought to polarize the p-n junctions using appropriate metal layers and contact vias.

The hybrid pnnp/nppn or nppn/pnnp SPP configuration leads to a symmetric operation around ground voltage, with the use of the differential modulating signal having a DC component of 0V and bias voltages.+−.Vb that are symmetric around ground voltage.

The MZ modulators depicted in FIGS. 6 and 7 above achieve equal phase modulation efficiency in the two MZ modulator arms by inverting half the p-n junctions along the length of the waveguide arms. The inverted and non-inverted p-n junctions may be placed in any order (referred to as the direction alternating sequence) along the waveguide arm's length. FIG. 8 shows the fabrication pattern of a variation of the optical modulator circuit depicted in FIGS. 6 and 7 above. As shown in FIG. 8, the non-inverted and inverted segments may be laid out in a different direction alternating sequence along the length of the waveguides as compared to FIGS. 6 and 7 above. Also, there may be different number of non-inverted and inverted segments to achieve an imbalanced operation. The proportion may be set to any number based on the desired amount of imbalance in the modulation efficiency of the two MZ modulator arms. Further, the bias voltage may be brought to the BBJC segments from any direction depending on the physical layout consideration, such as shown in FIG. 9. Specifically, FIG. 9 shows an example of routing variation in the bias voltages for the optical modulator circuit with the pnnp/nppn hybrid SPP.

Figure 10:
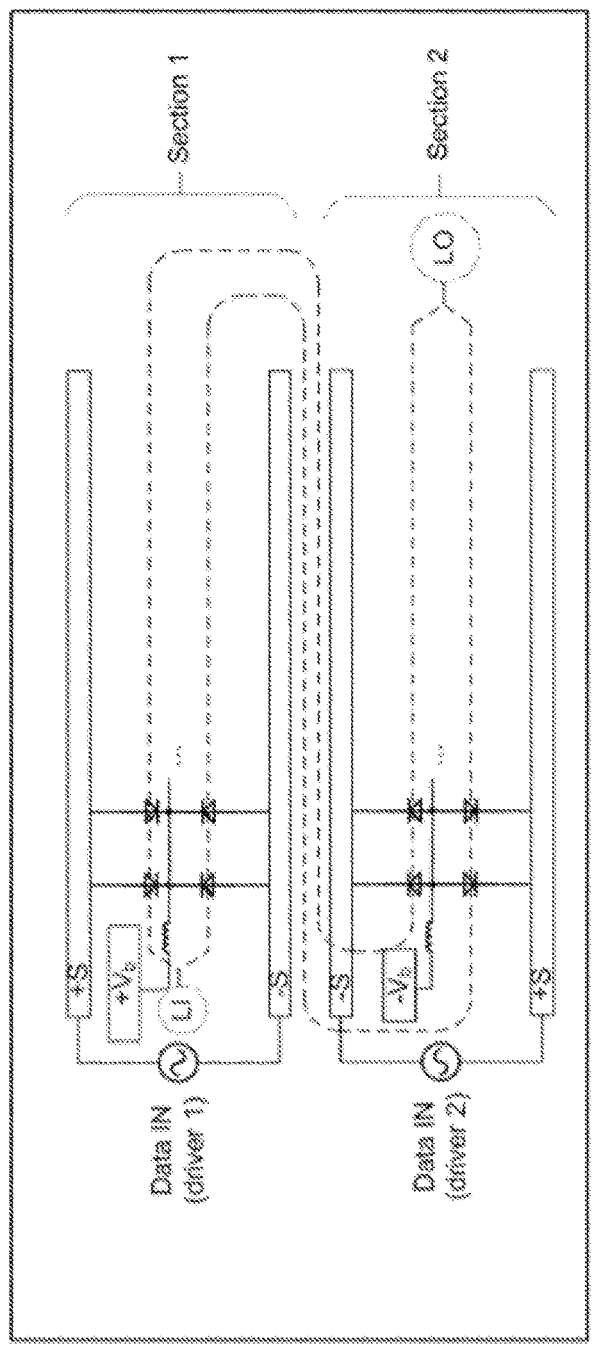
FIG. 10 shows the fabrication pattern of an example two-section optical modulator circuit having multiple segments in each section.

FIG. 10 shows the fabrication pattern of an example two-section optical modulator circuit having multiple segments in each section according to legend (400). In particular, the section 1 includes pnnp BBJCs and the driver polarity is such that the top electrode is connected to the +S terminal of the driver 1 while the bottom electrode is connected to the −S terminal of the driver 1. In the section 2, the direction of the p-n junctions is reversed (to cancel the impact of mask misalignment) for nppn BBJCs. In order to not to cancel the phase modulation imparted to the optical signal in the section 1, the driver polarity for the driver 2 is reversed. In other words, the top electrode in the section 2 is connected to the −S terminal of the driver 2 and the bottom electrode is connected to the +S terminal of the driver 2.

Figure 11:
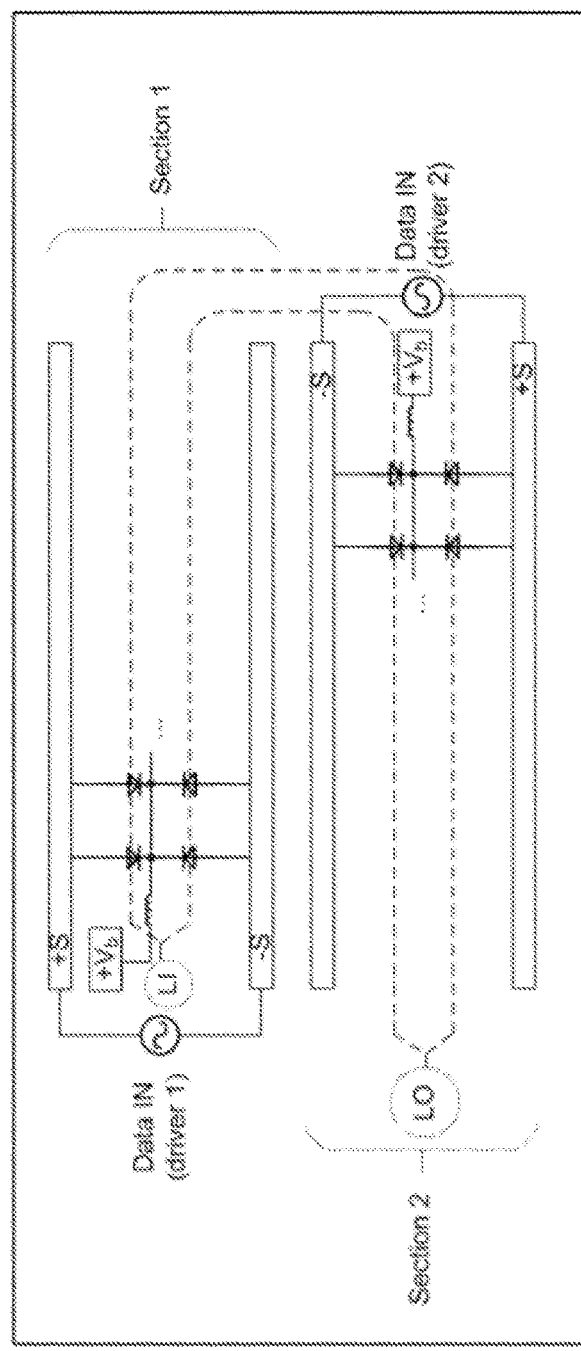
FIG. 11 shows the fabrication pattern in a variation of FIG. 10 where a second driver is disposed at the opposite side to the first driver.

In the configuration described above, the driver polarity is adjusted to cancel the imbalance caused by p-n junction misalignments. Specifically, the top waveguide in section 1 remains the top waveguide in section 2 to cancel the imbalance caused by mask misalignment. FIG. 11 shows the fabrication pattern in a variation of FIG. 10 where the driver 2 is disposed at the opposite side to the driver 1. In the variation, the top waveguide in section 1 becomes the bottom waveguide in section 2. To cancel the imbalance caused by mask misalignment, the p-n junction direction is maintained the same in both waveguides. In other words, both section 1 and section 2 use the pnnp SPP configuration. However, in order not to cancel the phase modulation imparted to the optical signal in the section 1, the driver polarity for the driver 2 is reversed. In other words, the top electrode is connected to the −S terminal of the driver 2 and the bottom electrode is connected to the +S terminal of the driver 2.

Although a RF traveling-wave electrode is described in the examples of FIGS. 4-11 above, the invention may equally apply to a N-section optical modulator circuit driven by N drivers where each section may be based on a lumped element (e.g., an electrode with a single segment containing two p-n junctions in a SPP configuration). The p-n junction directions over the optical waveguides and the connection of the SPP lumped segments to the drivers may be configured to cancel the imbalance in the modulation efficiency caused by mask alignment using the principles described above.

Although a reverse bias operation of the p-n junction is described in the examples above, the invention may equally apply to the p-n junctions in forward bias operation, such as used in forward conduction or in current injection.

Background Relative to RF Electrical Crossing

Again, an important requirement of a modulator is that the arms display very similar phase modulation efficiency. Arms dissimilarity causes imbalance of the phase modulation which in turn creates a phase variation of an optical carrier (chirp) at the output of the modulator. Misalignment of the lithographic masks defining the p and n doped regions with regards to the optical waveguide will induce an imbalance in the modulation efficiency for both arms of the SPP MZ modulator.

Figure 12:
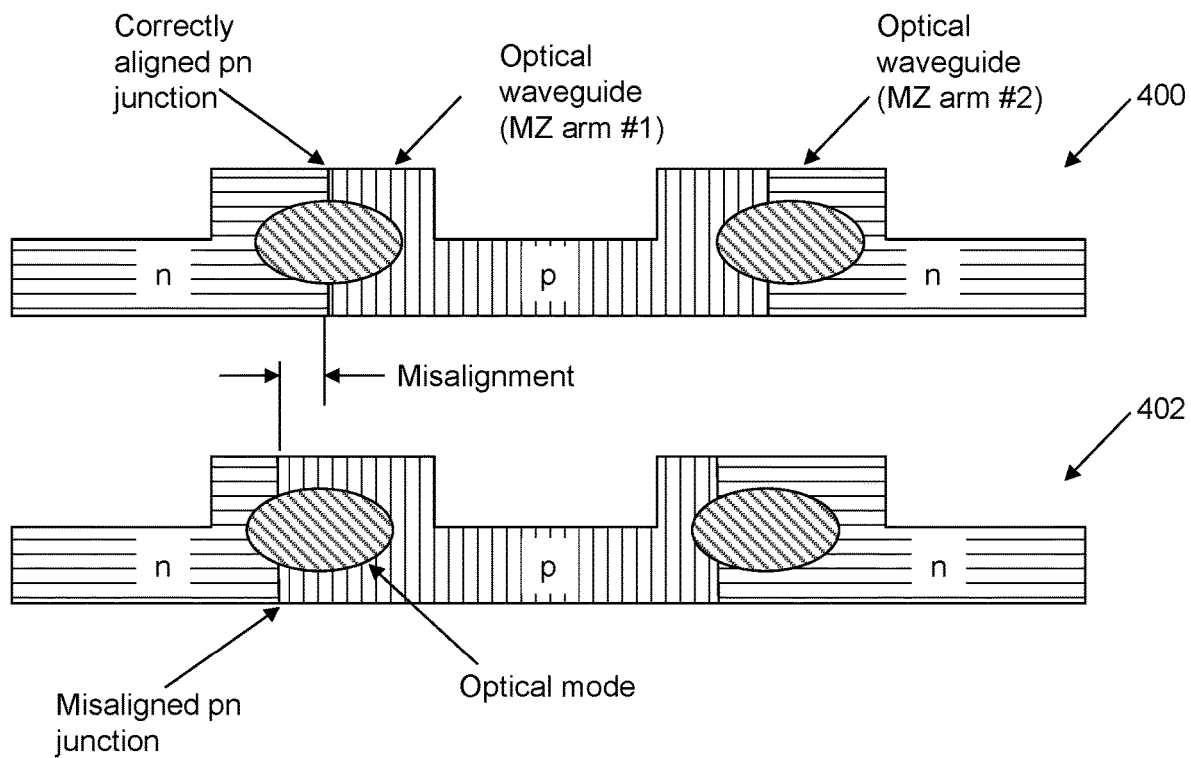
FIG. 12 shows a side view/cross-sectional view showing well aligned pn junctions and misaligned pn junctions of a SPP Mach-Zehnder modulator (MZM) modulator.

FIG. 12 is a side view/cross-sectional view showing pn junctions of a SPP MZM modulator 400 in a nppn configuration when the lithographic masks are well aligned and the pn junctions when the masks defining the p and n doped regions are misaligned with respect to their ideal position in a SPP MZM modulator 402. For the modulator 400, the pn junction is located in the center of each optical waveguides. The modulation of the depletion width of this pn junction affects the portion of the optical mode overlapping with it, which will be, in this case, the same for each optical waveguide. In the modulator 402, this offset of the pn junctions leads to the optical mode interacting with a larger portion of p-doped material on the waveguide at left (MZ arm #1) and with a larger portion of n-doped material on the waveguide at right (MZ arm #2). As the index variation associated to the modulation of the p and n-dope d material is different, the modulation efficiency for the two MZ arms will also differ, causing modulation imbalance.

Addressing Misalignment

Figure 13:
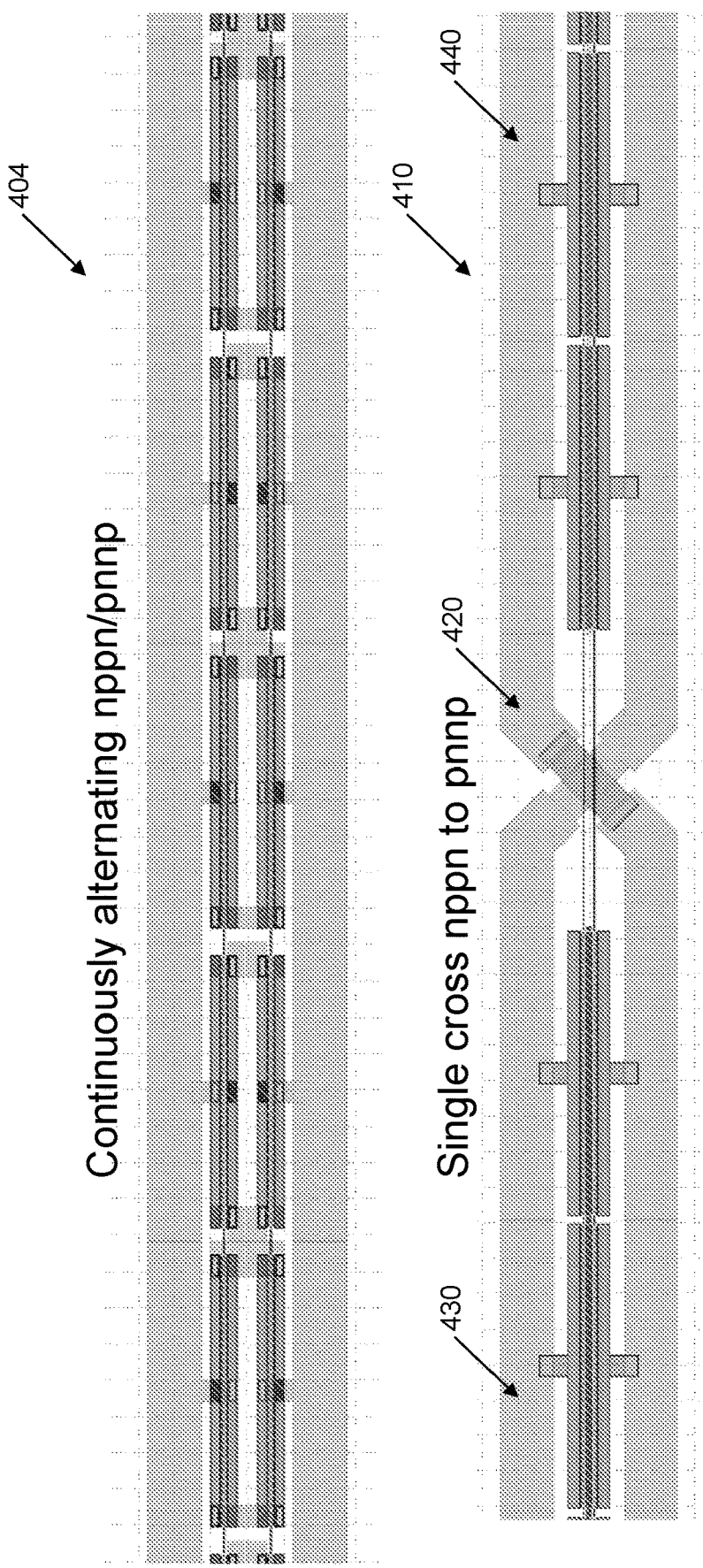
FIG. 13 shows a diagram of a modulator having continuously alternating nppn to pnnp sections and a modulator in accordance with one or more embodiments of the invention having a radio frequency (RF) line crossing between nppn segments and pnnp segments.

Different approaches to address this misalignment include asymmetrical biasing as described in U.S. patent application Ser. No. 16/111,423, filed Aug. 24, 2018, and entitled "Optical modulator and optical modulator driver devices and methods utilizing independent arm bias to mitigate fabrication errors," the contents of which are incorporated by reference herein in their entirety, or, as described herein in the parent application, U.S. patent application Ser. No. 16/609,069, via segmentation of the modulator by alternating each segment between nppn to pnnp to average out the imbalance. FIG. 13 shows a diagram of a modulator 404 having continuously alternating nppn to pnnp sections and a modulator 410 in in accordance with one or more embodiments of the invention having an RF line crossing 420 between nppn segments 430 and pnnp segments 440. Specifically, the modulator 410, instead of continuously alternating junctions (after each nppn or pnnp segment) along the entire length of a segmented modulator, includes the RF line crossing 420. Thus, for a given length of the modulator 410, half of the modulator 410 assumes a nppn configuration with the nppn segments 430 and pnnp for the remainder with the pnnp segments 440. Also, it can be noted that the RF line crossing 420 is effectively a single segment itself along with the nppn segments 430 and the pnnp segments 440.

The single crossing has the benefit of having a lower RF response impairment compared to a continually alternating design due to no additional metal work required other than the one crossing. However, the single crossing comes at the expense of a frequency dependent RF imbalance, whereas a continually alternating design has no frequency dependent RF imbalance. The design of the RF line crossing 420 is described in further detail herein to discuss the frequency dependent RF imbalance.

RF Line Crossing and pn Junction Orientation Inversion

Figure 14:
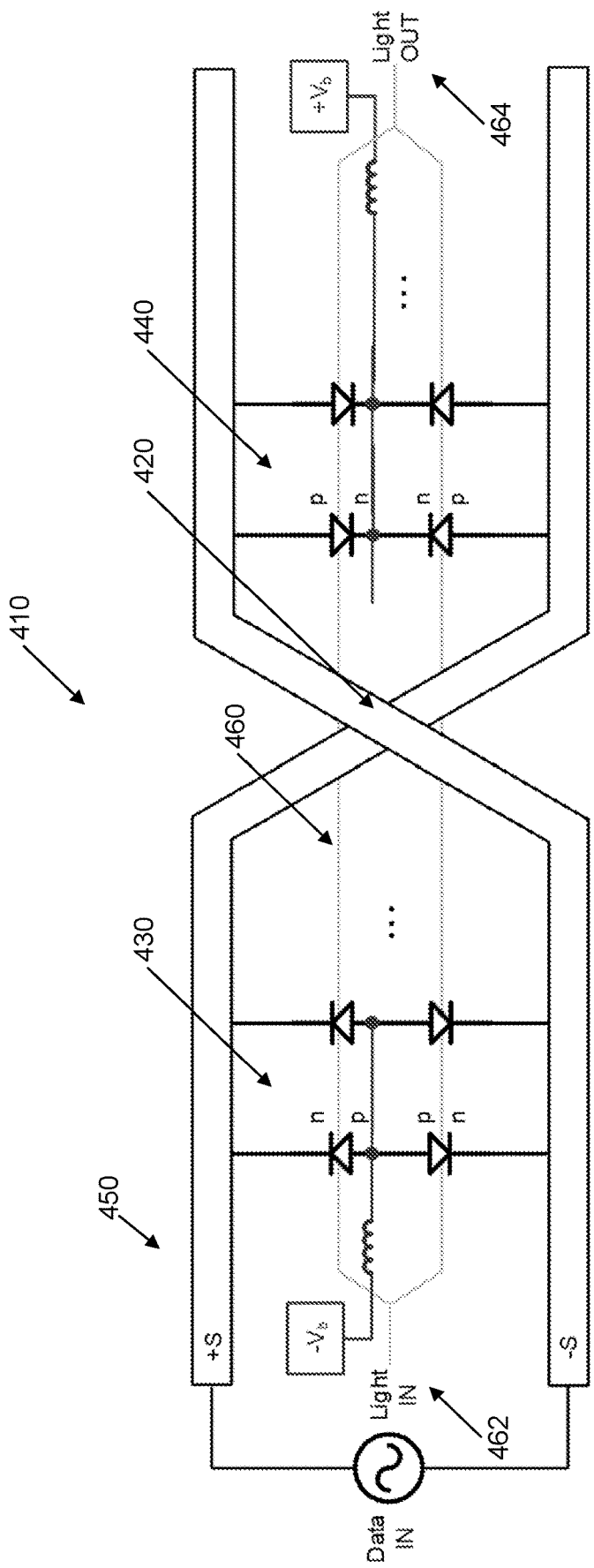
FIG. 14 shows a circuit diagram/fabrication pattern of the modulator of FIG. 13 including the RF line crossing and an inversion of the orientation of the pn junction at the RF line crossing.

FIG. 14 shows a circuit diagram of the modulator 410 including the RF line crossing 420 and an inversion of the orientation of the pn junction at the RF line crossing 420. Specifically, one side of the modulator 410 includes the nppn segments 430 and the other side demarcated by the RF line crossing 420 includes the pnnp segments 440, i.e., for the inversion of the orientation. Therefore, pn junctions located to the left of the RF line crossing 420 will have the same orientation, as a nppn configuration requiring a negative bias voltage for high speed operation under depletion. On the other end, pn junctions located to the right of the RF line crossing 420 are in a pnnp configuration and require a positive bias voltage.

As described herein, orientation means how the pn junctions are in terms of n type and p type regions in each segment. This is visually presented in the equivalent circuit diagrams by the diode orientation. For example, in FIG. 14, the segments 430 include a nppn configuration whereas the segments 440 include a pnnp configuration. This is presented for illustration purposes, and those skilled in the art will recognize any of the alternating orientations described herein can be used with the RF line crossing 420.

RF line crossing 420 can be implemented using bridges (via) connecting two layers of metal at different height in the chip stack-up, allowing one metal electrode to go under the other. The electrode and via layout at the crossing point can be optimized so that the drawback of doing the RF line crossing 420 are eliminated or attenuated. The drawback of RF line crossing 420 is possible degradation in RF response that may need some RF design optimizations. Metal line width and geometry are factors that can be used to make this optimization, as is described in further detail herein. Also, RF crossing 420 does not necessarily have to be on the die, it can also be performed off die, such as, for example on an interposer or substrate, as long as the velocity match (delay) between the RF and optical waves is maintained.

The location of the RF line crossing 420 need not be at the modulator 410 center. Optimization of the modulator extinction ratio (ER) would favor using a crossing point midway between RF line input and output so as to have an equal number of pn junctions oriented in one direction before and after the crossing point. This would equalize the pn junction loss in the event that the doping regions are misaligned. Alternatively, one could favor RF imbalance optimization, which would require shifting the crossing point towards the input because the RF signal gets attenuated as it propagates on the RF line (so more pn junctions are required after the RF line crossing 420 to get the same phase efficiency at a given frequency or frequency optimization point as that provided by the pn junctions located before the crossing point, i.e., the pnnp segments 440 are longer than the nppn segments 430). Note that the number of pn junction segments before and after the RF crossing point need not be equal, depending on the optimization strategy.

In an embodiment, the pn junctions can be in segments periodically connected to an RF line 450 (denoted by +S and −S), or, in another embodiment, continuously connected along the RF line 450.

In another embodiment, more than one crossing points could be used to allow both the equalization of optical loss and removal of the RF imbalance.

Also, the RF delay accumulated in the crossing area of the RF line crossing 420 could be large enough to require the addition of an optical delay to ensure the RF wave is still in-phase with the optical phase after the crossing.

One skilled in the art will understand that any combination of physical arrangements for the pn junctions, their interconnection to one another and to the RF transmission line, as described in the parent application, U.S. patent application Ser. No. 16/609,069, can be imagined and still fall under the umbrella of the present invention.

Bias voltage polarities are such as to provide operation in depletion mode of the pn junction (for fastest operation speed). But one could operate the modulator 410 using arbitrary voltage polarity, provided that the polarity is reversed at the crossing point.

The bias voltage can be brought to the pn junctions as illustrated in FIG. 14 (i.e. from the left for the first section at left, and from the right for the second section at right) but any other configuration/combination could be used as well [for example, it could come from the north side (top) instead of from the west side (left)]. The bias voltage could also be brought directly to the center of a section using proper bridges or doped silicon layers.

The polarity of the pn junctions before and after the RF crossing (i.e. configuration nppn or pnnp) is arbitrary and depends on the application and on the type of modulator driver used. For example, it is possible to have pnnp on the left side and nppn on the left side, with corresponding change in the bias voltages, i.e., the segments 430, 440 reversed.

The RF line 450 could also be of another type other than a coplanar strip. For example, external ground lines could be added to realize a GSSG (ground-signal-signal-ground) RF line configuration, potentially enabling attachment of components between the signal and ground electrodes at the transition point to optimize the response. Moreover, in such case, components (discrete or integrated) could be attached to the RF line at the crossing point to tune the modulator frequency response, as desired.

Optical Modulator

In FIG. 14, in an embodiment, an optical modulator 410 includes a first Radio Frequency (RF) line 450 (+S) and a second RF line 450 (−S); an optical waveguide 460 along the length with an input (light in 462) and an output (light out 464); and a plurality of segments 420, 430, 440 including a first set of pn junctions 430, an RF line crossing 420, and a second set of pn junctions 440, wherein the first set of pn junctions 430 and the second set of pn junctions 440 have an inversion of their respective orientation at the RF line crossing 420 and wherein the RF line crossing is located at a crossing segment that is not a center segment of the plurality of segments, and wherein each of the first RF line 450 (+S) and the second RF line 450 (−S) extend a length of the modulator 410 and cross one another at the RF line crossing 420.

A location of the crossing segment can be based on an average loss or sum of voltages over a band of interest. A location of the crossing segment can be selected based on RF imbalance caused by the RF line crossing. The crossing segment can be located closer to the input than the output along the length.

A geometry of the RF line crossing can include any of a length of unloaded lines, a width of the unloaded lines, and an angle of crossing lines connected to respective unloaded lines, and wherein the part or all of the geometry can be selected such that one or more characteristics of the crossing segment are similar to corresponding one or more characteristics of modulator segments of the plurality of segments. The one or more characteristics can include any capacitance, inductance, impedance, and dielectric constant.

Each segment in the first set of pn junctions can have a same orientation, and each segment in the second set of pn junctions has a same orientation different from the orientation of the first set of pn junctions. One or more segments in the first set of pn junctions can have a different orientation from one another, and one or more segments in the second set of pn junctions has a different orientation from one another. The respective orientation in each of the first set of pn junctions and the second set of pn junctions can be one of a nppn configuration and a pnnp configuration. Each segment of the plurality of segments can have about a same length, and wherein the RF line crossing has the same length. Each segment except the crossing segment of the plurality of segments can be connected to the first RF line and the second RF line.

In another embodiment, an optical modulator includes a first Radio Frequency (RF) line and a second RF line; an optical waveguide along a length of the modulator with an input and an output; and a plurality of segments along the length including a first set of pn junctions, an RF line crossing at a crossing segment, and a second set of pn junctions, wherein the first set of pn junctions and the second set of pn junctions have an inversion of their respective orientation at the RF line crossing, wherein each of the first RF line and the second RF line extend along the length and cross one another at the RF line crossing, and wherein a geometry of the RF line crossing includes any of a length of unloaded lines, a width of the unloaded lines, and an angle of crossing lines connected to respective unloaded lines, and wherein the part or all of the geometry is selected such that one or more characteristics of the crossing segment are similar to corresponding one or more characteristics of modulator segments of the plurality of segments. The one or more characteristics can include any capacitance, inductance, impedance, and dielectric constant.

In a further embodiment, the optical modulator 410 includes a plurality of segments 420, 430, 440 disposed along a length of the modulator 410; a first Radio Frequency (RF) line 450 (+S) and a second RF line 450 (−S), each on opposite sides of the plurality of segments 420, 430, 440; an optical waveguide 460 along the plurality of segments 420, 430, 440 with an input 462 and an output 464; and an RF line crossing 420 at one of the plurality of segments where the first RF line 450 (+S) and the second RF line 450 (−S) switch sides, and wherein the plurality of segments include a first set of pn junctions 430 and a second set of pn junctions 440, wherein a segment of the first set of pn junctions and a segment of the second set of pn junctions have an inversion of their respective orientation at the RF line crossing 420.

RF Line Crossing Design Considerations

For high frequency signaling and high bit-rates, it is imperative to keep the speed of light propagation along the optical waveguide 460 the same as the speed of the electrical modulation signals along the length of the MZM modulator 410. The electrical speed along the electrical RF rail line 450 is determined by the total capacitance and the equivalent inductance of the transmission line per unit length, namely Electrical Propagation Speed $v_e \propto \sqrt{L_e C_e}$ At the crossing point, the capacitance and inductance of the line is controlled by its transmission line geometry and the Silicon die stackup (buildup of various metallization and dielectric layers). At the design of the RF crossing section, the geometries are designed in such a way that the equivalent capacitance and inductance ratio and product is comparable to the original transmission lines loaded with active region electrodes so that the resulting characteristic impedance and propagation speeds remain as close as possible to the loaded transmission lines along the rest of the modulator region, namely Characteristic Impedance $$z_e \propto \sqrt{\frac{L_e}{C_e}}$$

FIGS. 15.1 and 15.2 show close-up views of the RF line crossing 420 design. FIG. 15.1 shows a top view and FIG. 15.2 shows a perspective view with an equivalent circuit diagram. Of note, the RF lines 450 are crossed at the RF line crossing 420, with the top rail +S switching to the bottom rail, and the bottom rail −S switching to the top rail. At the RF line crossing 420, one of the rails is configured to traverse under the other rail.

The geometry of the RF line crossing 420 design is selected to provide a characteristic performance very close to the actual modulator segments 430, 440, therefore expecting a smoother ripple performance. Aspects of the geometry include having a segment including the RF line crossing 420 having an approximate equal length as the segments 430, 440. Other aspects include the crossing angles, length, etc.

In FIGS. 15.1 and 15.2, the RF crossing 420 includes unloaded lines 470 and crossing lines 472. In FIG. 15.2, the equivalent circuit diagram illustrates the unloaded lines 470 are dominated by inductance whereas the crossing lines 472 are dominated by capacitance. The RF crossing 420 is one segment of the multiple segments 430, 440 in the optical modulator 410. Note, the segment with the RF crossing 420 does not perform modulation. But an objective of the present disclosure is that the segment with the RF crossing 420 behaves similarly as the actual modulator segments 430, 440. That is, characteristics of the RF crossing are engineered so the segment with the RF crossing 420 behaves similarly as the actual modulator segments 430, 440. These characteristics can include one or more of effective dielectric constant, capacitance per unit length, inductance per unit length, propagation speed, and differential impedance (Zo) versus frequency. The propagation speed includes having a delay in the RF crossing that maintains a same delay as the actual modulator segments 430, 440.

The geometry of the segment with the RF crossing 420 includes a width (narrowness) of the unloaded lines 470, a length of the unloaded lines 470 outside of the actual crossing (where the crossing lines 472 intersect), angles of the crossing lines 472, and the like. Again, the geometry here is selected so the characteristics are similar to that of the actual modulator segments 430, 440. In an embodiment, the width (narrowness) of the unloaded lines 470 and the length of the unloaded lines 470 outside of the actual crossing is used to put preference on inductance to offset the capacitance of the crossing lines 472 lines primarily determined by of the metal overlap area. That is, the width and length of the unloaded lines 470 is selected to have an inductance to offset the capacitance of the crossing lines 472. Further, it is possible to include other metal features around the crossing lines 472, such as floating metal structures, where the other metal features contribute to frequency dependent characteristics. Those skilled in the art will recognize there are various approaches to changing the geometry of the RF crossing 420 to match the characteristics, and all such approaches are contemplated herein. Also, those skilled in the art will recognize the characteristics are determined based on a frequency of interest.

In determining the geometry, the characteristics of the modulator segments 430, 440 are extracted and the geometry of the RF crossing 420 is simulated to compare with the extracted characteristics. Different values of the geometry (e.g., any of a length of unloaded lines 470, a width of the unloaded lines 470, metal features around the crossing lines 472, and an angle of crossing lines 472 connected to respective unloaded lines 470) are analyzed and compared to the extracted characteristics to find similarity. Those skilled in the art will appreciate this can be performed with a simulation tool or the like.

Location of the RF Line Crossing

Figure 16:
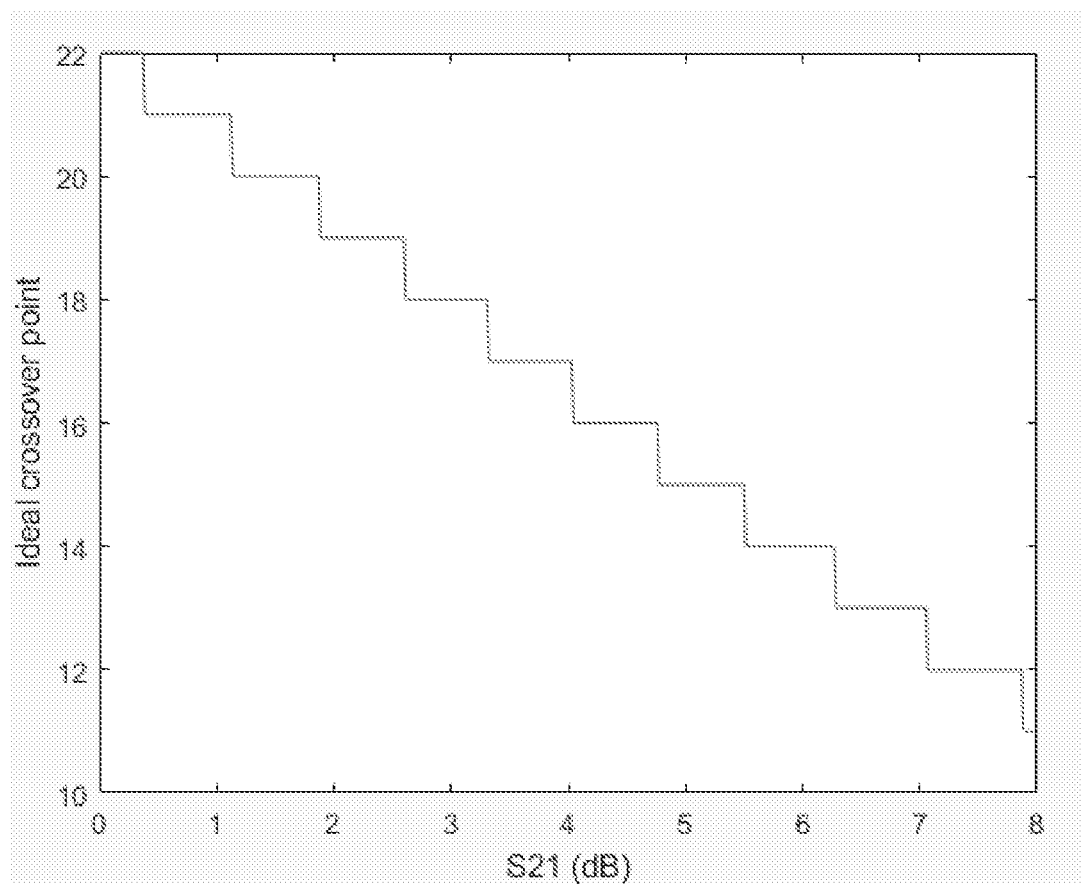
FIG. 16 shows a graph of the ideal crossover point for the RF line crossing relative to the S21 parameter.

FIG. 16 shows a graph of the ideal crossover point for the RF line crossing 420 relative to the S21 parameter (forward gain voltage). The location of the RF line crossing 420 is as critical as the RF crossing 420 geometry design itself since it balances out the fabrication error and phase efficiency of the two arms (RF lines). Choosing the RF crossing at 50% of the length, i.e., at a center segment, offers the best balance at DC, resulting in the highest Extinction ratio. However, this is not the most optimal position for the RF, since the single crossing results in a frequency dependent RF imbalance. For example, an optical signal in the first half of the modulator 410 will experience more modulation from the modulator segments 430 than in the second half from the modulator segments 440.

Thus, in addition to optimizing the geometry of the RF crossing 420, the present disclosure includes locating the RF crossing 420 not in the center or intermediate segment. The optimum location of the RF line crossing 420 is to find the average loss or the sum of the voltages over the band of interest. So that the sum of the voltages of the segment before the crossing has the same sum after the crossing. For example, in the FIG. 16, if the average loss was 3 dB for a 44 Segment modulator, the optimal crossing would occur after the 18th segment, i.e. 18 segments before the crossing and 24 segments after.

Experimental Results

FIGS. 17.1 and 17.2 show graphs illustrating per unit length characteristics of the modulator segment (FIG. 17.1) with the RF line crossing relative to the modulator segment (FIG. 17.2) without the RF line crossing. Here, the modulator 410 is the one in FIG. 15.1, and it is noted the performance is consistent with the modulator 406. Here, it is shown the different characteristics were set for the segment with the RF crossing 420 such that the behavior is similar to that of the actual modulator segment. FIG. 17.3 shows a graph of a 44 segment modulator comparing the performance of the modulator 410 and the modulator 406.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical modulator comprising:
a first Radio Frequency (RF) line and a second RF line;
an optical waveguide along a length of the modulator with an input and an output; and
a plurality of segments along the length including a first set of segments, a single RF line crossing after the first set of segments, and a second set of segments after the RF line crossing, and wherein the RF line crossing is located off center relative to the plurality of segments, wherein each of the first RF line and the second RF line extend along the length and cross one another at the RF line crossing,
wherein each segment in the first set of segments has a same orientation, and each segment in the second set of segments has a same orientation different from the orientation of the first set of segments.

2. The optical modulator of claim 1, wherein a location of the single RF line crossing is based on an average loss or sum of voltages over a band of interest.

3. The optical modulator of claim 1, wherein a location of the single RF line crossing is selected based on RF imbalance caused by the RF line crossing.

4. The optical modulator of claim 1, wherein the single RF line crossing is located closer to the input than the output along the length.

5. The optical modulator of claim 1, wherein the single RF line crossing is located closer to the output than the input along the length.

6. The optical modulator of claim 1, wherein a geometry of the single RF line crossing includes any of a length of unloaded lines, a width of the unloaded lines, metal features around the RF line crossing, and an angle of crossing lines connected to respective unloaded lines.

7. The optical modulator of claim 6, wherein part or all of the geometry is selected such that one or more characteristics of the crossing segment are similar to corresponding one or more characteristics of modulator segments of the plurality of segments.

8. The optical modulator of claim 7, wherein the one or more characteristics include any capacitance, inductance, impedance, propagation speed, and dielectric constant.

9. The optical modulator of claim 1, wherein a geometry of the single RF line crossing includes a length of unloaded lines, selected based on one or more characteristics including any capacitance, inductance, impedance, propagation speed, and dielectric constant.

10. The optical modulator of claim 1, wherein a geometry of the single RF line crossing includes a width of the unloaded lines, selected based on one or more characteristics including any capacitance, inductance, impedance, propagation speed, and dielectric constant.

11. The optical modulator of claim 1, wherein a geometry of the single RF line crossing includes metal features around the RF line crossing, selected based on one or more characteristics including any capacitance, inductance, impedance, propagation speed, and dielectric constant.

12. The optical modulator of claim 1, wherein a geometry of the single RF line crossing includes an angle of crossing lines connected to respective unloaded lines, selected based on one or more characteristics including any capacitance, inductance, impedance, propagation speed, and dielectric constant.

13. The optical modulator of claim 1, wherein each segment except the crossing segment of the plurality of segments is connected to the first RF line and the second RF line.

14. An optical modulator comprising:
a first Radio Frequency (RF) line and a second RF line;
an optical waveguide along a length of the modulator with an input and an output; and
a plurality of segments along the length including a first set of segments, a single RF line crossing after the first set of segments, and a second set of segments after the RF line crossing, and wherein the RF line crossing is located off center relative to the plurality of segments, wherein each of the first RF line and the second RF line extend along the length and cross one another at the RF line crossing,
wherein a geometry of the single RF line crossing includes one or more of a length of unloaded lines, selected based on one or more characteristics including any capacitance, inductance, impedance, propagation speed, and dielectric constant, a width of the unloaded lines, selected based on one or more characteristics including any capacitance, inductance, impedance, propagation speed, and dielectric constant, metal features around the RF line crossing, selected based on one or more characteristics including any capacitance, inductance, impedance, propagation speed, and dielectric constant, and an angle of crossing lines connected to respective unloaded lines, selected based on one or more characteristics including any capacitance, inductance, impedance, propagation speed, and dielectric constant.

15. The optical modulator of claim 14, wherein a location of the single RF line crossing is based on an average loss or sum of voltages over a band of interest.

16. The optical modulator of claim 14, wherein a location of the single RF line crossing is selected based on RF imbalance caused by the RF line crossing.

17. The optical modulator of claim 14, wherein the single RF line crossing is located closer to the input than the output along the length.

18. The optical modulator of claim 14, wherein the single RF line crossing is located closer to the output than the input along the length.

19. The optical modulator of claim 14, wherein each segment in the first set of segments has a same orientation, and each segment in the second set of segments has a same orientation different from the orientation of the first set of segments.

20. The optical modulator of claim 14, wherein each segment except the crossing segment of the plurality of segments is connected to the first RF line and the second RF line.

* * * * *